(12) United States Patent
Bellegarda

(10) Patent No.: US 7,124,081 B1
(45) Date of Patent: Oct. 17, 2006

(54) METHOD AND APPARATUS FOR SPEECH RECOGNITION USING LATENT SEMANTIC ADAPTATION

(75) Inventor: Jerome R. Bellegarda, Los Gatos, CA (US)

(73) Assignee: Apple Computer, Inc., Cupertino, CA (US)

(*) Notice: Subject to any disclaimer, the term of this patent is extended or adjusted under 35 U.S.C. 154(b) by 690 days.

(21) Appl. No.: 09/967,072

(22) Filed: Sep. 28, 2001

(51) Int. Cl.
*G10L 15/00* (2006.01)
*G10L 15/28* (2006.01)
*G10L 15/06* (2006.01)

(52) U.S. Cl. .................. 704/255; 704/244

(58) Field of Classification Search ............ 704/240, 704/236, 231, 244; 707/5
See application file for complete search history.

(56) References Cited

U.S. PATENT DOCUMENTS

| | | | |
|---|---|---|---|
| 4,839,853 A * | 6/1989 | Deerwester et al. ........... 707/5 |
| 6,208,971 B1 * | 3/2001 | Bellegarda et al. ......... 704/275 |
| 6,289,353 B1 * | 9/2001 | Hazlehurst et al. ......... 707/102 |
| 6,356,864 B1 * | 3/2002 | Foltz et al. .................... 704/1 |
| 6,374,217 B1 * | 4/2002 | Bellegarda ................. 704/240 |
| 6,510,406 B1 * | 1/2003 | Marchisio ....................... 704/9 |
| 6,654,740 B1 * | 11/2003 | Tokuda et al. ................. 707/5 |
| 6,701,305 B1 * | 3/2004 | Holt et al. ..................... 706/45 |
| 6,757,646 B1 * | 6/2004 | Marchisio ....................... 704/8 |
| 6,807,536 B1 * | 10/2004 | Achlioptas et al. .......... 706/15 |
| 6,862,710 B1 * | 3/2005 | Marchisio ................ 715/501.1 |
| 6,882,747 B1 * | 4/2005 | Thawonmas et al. ....... 382/190 |
| 2002/0087508 A1 * | 7/2002 | Hull et al. ...................... 707/1 |
| 2004/0030996 A1 * | 2/2004 | Van Liempd et al. ....... 715/526 |
| 2005/0022114 A1 * | 1/2005 | Shanahan et al. ........... 715/513 |

OTHER PUBLICATIONS

Bellegarda, Jerome. "Exploiting Latent Semantic Information in Statistical Language Modelling", Proceedings of the IEEE, Aug. 2000, vol. 88, issue 8, pp. 1279-1296.*
Bellegarda, Jerome. "A Latent Semantic Analysis Framework for Large-Span Language Modeling" Eurospeech, 5th European Conference on Speech Communication and Technology, Sep. 22-25, 1997.*
Bellegarda, Jerome. "Large Vocabulary Speech Recognition with Multispan Statistical Language Models", IEEE transactions on speech and audio processing, vol. 8, Jan. 2000.*
C. Papadimiriou et al., Latent Semantic Indexing: A probabilistic Analysis, Abstract, Nov. 14, 1997, Computer Science Division, U.C. Berkeley, Berkeley.

* cited by examiner

*Primary Examiner*—David Hudspeth
*Assistant Examiner*—Matthew J. Sked
(74) *Attorney, Agent, or Firm*—Blakely, Sokoloff, Taylor & Zafman LLP

(57) ABSTRACT

A method and apparatus for speech recognition using latent semantic adaptation is described herein. According to one aspect of the present invention, a method for recognizing speech comprises using latent semantic analysis (LSA) to generate an LSA space for a collection of documents and to continually adapt the LSA space with new documents as they become available. Adaptation of the LSA space is optimally two-sided, taking into account the new words in the new documents. Alternatively, adaptation is one-sided, taking into account the new documents but discarding any new words appearing in those documents.

55 Claims, 14 Drawing Sheets

METHOD AND APPARATUS FOR SPEECH RECOGNITION USING LATENT SEMANTIC ADAPTATION

BACKGROUND OF THE INVENTION

1. Field of the Invention

The present invention relates generally to pattern recognition. More particularly, this invention relates to speech recognition systems using latent semantic analysis.

2. Copyright Notice/Permission

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2001, Apple Computer, Inc., All Rights Reserved.

3. Background

As computer systems have evolved, the desire to use such systems for pattern recognition has grown. Typically, the goal of pattern recognition systems is to quickly provide accurate recognition of input patterns. One type of pattern recognition system is a voice recognition system, which attempts to accurately identify a user's speech. Another type of pattern recognition is a handwriting recognition system. A speech recognizer discriminates among acoustically similar segments of speech to recognize words, while a handwriting recognizer discriminates among strokes of a pen to recognize words.

An important advancement in speech recognition technology is the use of semantic pattern recognition known as semantic language modeling. Semantic language modeling uses the context of the spoken words to decide which words are most likely to appear next, the context referring to the domain or subject matter of the words as well as the style. For example, a speech recognition application using semantic language modeling will favor the word sequence "recognize speech" over "wreck a nice beach" when the subject matter is speech processing, and vice versa when the subject matter has to do with vacations at the beach.

In semantic language modeling, the domain and style of the spoken words is captured using latent semantic analysis (LSA). LSA is a modification of a paradigm that was first formulated in the context of information retrieval and reveals meaningful associations in language based on semantic patterns previously observed in a corpus of language representative of a particular domain and style, for example, a training corpus having to do with speech processing vs. vacations at the beach. The semantic patterns are word-document co-occurrences that appear in the training corpus, where the corpus is comprised of a collection of one or more documents that contain paragraphs and sentences or other collections of words representative of the domain and style.

The semantic knowledge represented by the semantic patterns is encapsulated in a continuous vector space, referred to as the LSA space, by mapping those word-document co-occurrences into corresponding word and document vectors that characterize the position of the words and documents in the LSA space. During speech recognition, any new words or documents are first mapped onto a point in the LSA space, and then compared to the existing word and document vectors in the space using a similarity measure, a process referred to as semantic inference. Those new words and documents that map most closely to the existing word and document vectors in the LSA space are recognized over those that do not.

A limitation in current implementations of speech recognition applications using semantic language modeling is that the LSA space is a fixed semantic space. This means that semantic patterns not observed in the training corpus cannot be captured and later exploited during speech recognition. As a result, changes in the domain of the speech, or even just changes in the style of the speech, may not be properly recognized. In the case of financial news, for example, this means that an LSA-based speech recognition application trained on a collection of documents, say, from the Wall Street Journal, will not perform optimally on new documents from the Associated Press, and vice versa. The use of a fixed semantic space is particularly deleterious in applications with many heterogeneous domains, such as an information retrieval system, since no database is big enough to contain a training corpus representative of all domains. It is also less than ideal for horizontal (i.e. non-specialized) dictation applications, because the same user typically adopts different styles in different contexts, for example the formal style of a business letter vs. the informal style of a personal letter.

Distributed training seeks to overcome some of the limitations of a fixed semantic space by creating a distinct semantic space for each usage condition. Thus, using the financial news example, there would be one LSA space for the Wall Street Journal, and another LSA space for the Associated Press. However, it is often impossible to predict ahead of time which kind(s) of text the end user will want to process, and even when that can be done, for most narrowly defined contexts and styles it may be challenging to gather enough data to reliably train the speech recognition system.

Explicit modeling also seeks to overcome some of the limitations of a fixed semantic space by including a task (i.e. domain) and/or style component into the LSA paradigm. For example, it has been suggested to define a stochastic matrix to account for the way style modifies the frequency of words (C. H. Papadimitriou, P. Raghavan, H. Tamaki, and S. Vempala, "*Latent Semantic Indexing: A Probabilistic Analysis,*" in *Proc. 17th ACM Symp. Princip. Database Syst.,* Seattle, Wash., 1998). However, this approach makes the assumption—largely invalid—that the influence of style on word frequency is independent of the underlying domain.

Another approach to the problem of a fixed semantic space is to re-compute the LSA space to account for the new words and documents as they become available. One way is simply to re-compute the LSA space from scratch, referred to as full re-computation. Another way is to re-compute the LSA space from scratch, but keeping the dimension of the LSA space constant, referred to as constant dimension re-computation. But full or constant dimension re-computation requires significant additional processing. The additional processing is undesirable since it consumes additional central processor unit (CPU) cycles and degrades responsiveness.

Yet another approach to the problem of a fixed semantic space is to adapt the LSA space to account for the new documents and new words in the new documents as they become available by using traditional "folding-in" to incorporate new variants in the existing LSA space, referred to as baseline adaptation. While less computationally intensive, baseline adaptation results in speech misclassification error rates of unacceptably high levels. What is needed, therefore, is an improved method and apparatus for using semantic language modeling in a speech recognition system to more accurately recognize speech.

SUMMARY OF THE INVENTION

A method and apparatus for speech recognition using latent semantic adaptation is described herein. According to one aspect of the present invention, a method for recognizing speech comprises generating a latent semantic analysis (LSA) space for a collection of documents and the words appearing in those documents, and to continually adapt the LSA space with new documents as they become available. Adaptation of the LSA space is optimally two-sided, taking into account the new documents, as well as the new words that appear in those new documents. Alternatively, adaptation is one-sided, taking into account the new documents, but discarding any new words appearing in those new documents.

According to one aspect of the present invention, a computer-readable medium has executable instructions to cause a computer to perform a method to generate a speech recognition database comprising generating an LSA space for a collection of documents and the words appearing in those documents, and continually adapting the LSA space with new documents or both new documents and new words, as they become available.

According to one aspect of the present invention, an apparatus for recognizing speech includes an adapted LSA space generator. The adapted LSA space generator generates an LSA space from a collection of documents and the words appearing in those documents, and continually adapts the LSA space with new documents or both new documents and new words, as they become available.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
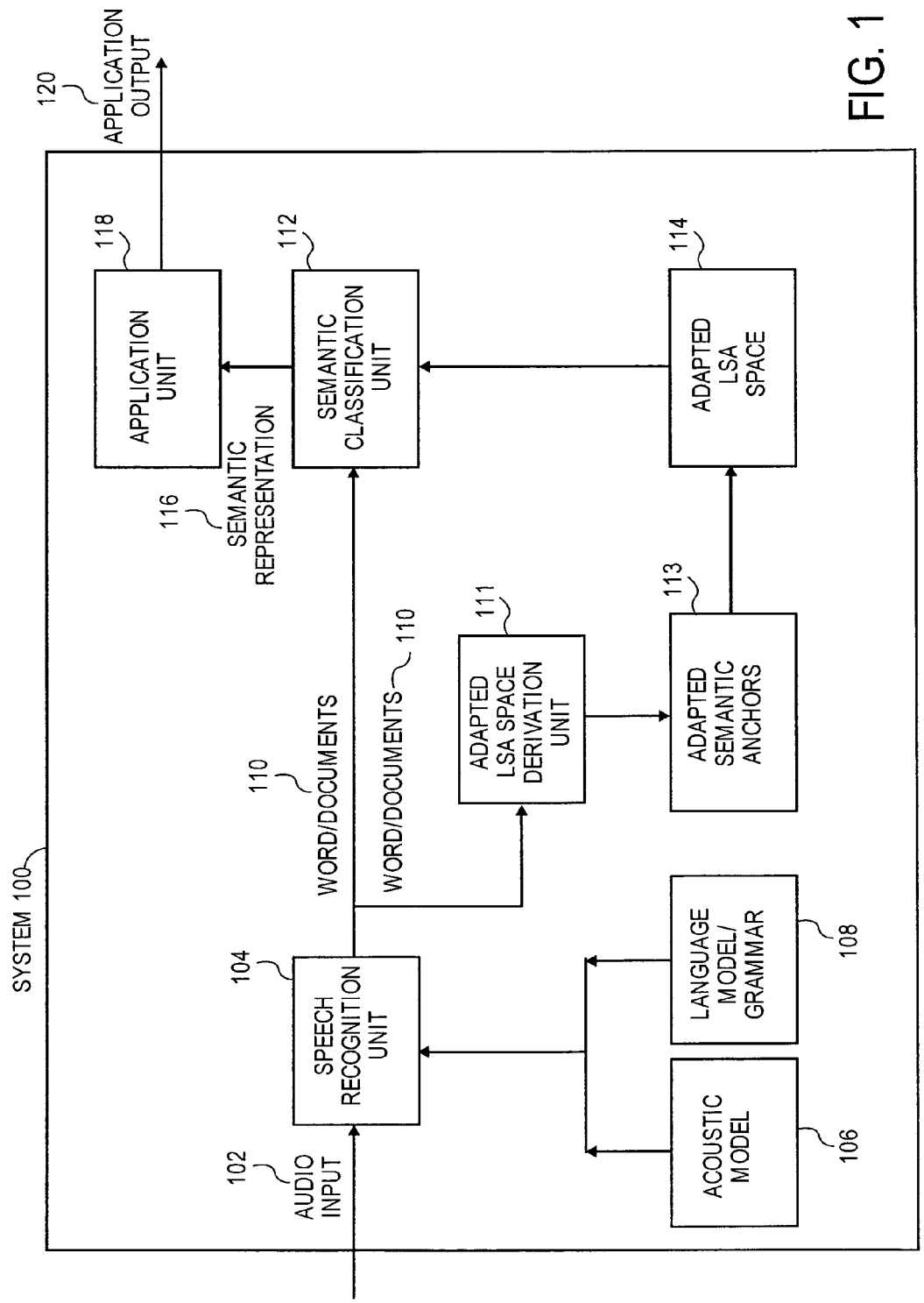
FIG. 1 is a block diagram that illustrates the use of latent semantic adaptation in the context of a speech recognition system using semantic inference, in accordance with one embodiment of the present invention.

In the following description, various aspects of the present invention will be described. However, it will be understood by those skilled in the art that the present invention may be practiced with only some or all aspects of the present invention. For purposes of explanation, specific numbers, materials and configurations are set forth in order to provide a thorough understanding of the present invention. However, it will also be apparent to those skilled in the art that the present invention may be practiced without these specific details.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As is well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, systems, and the like, that are standalone, adjunct or embedded.

Additionally, various operations will be described as multiple discrete steps in turn in a manner that is helpful in understanding the present invention. However, the order of description should not be construed as to imply that these operations are necessarily order dependent, in particular, the order of their presentations.

The present invention provides a method and apparatus for speech recognition using semantic language modeling. Specifically, the method and apparatus use latent semantic adaptation to reduce the misclassification error rate in speech recognition applications without sacrificing computational efficiency.

Latent semantic adaptation is a process of using latent semantic analysis (LSA) to capture the semantic patterns appearing in a training corpus of language by mapping them into a continuous vector space, referred to as an LSA space, and continually adapting the LSA space with new semantic patterns as they appear over time. The training corpus is a collection of documents, where documents are instances of sentences, phrases, or other word groupings representative of a particular domain and style of language composition.

Because semantic patterns that are not present in the training corpus cannot be captured, current implementations of semantic language modeling using LSA exhibit a relatively high sensitivity to changes in both the domain and style of language composition when using a particular speech recognition application. For example, as noted previously in the financial news example, an LSA-based speech recognition application trained on a collection of documents, say, from the Wall Street Journal, will not perform optimally on new documents from the Associated Press, and vice versa.

In accordance with the method and apparatus of the present invention, however, the incremental adaptation of the LSA space improves performance by continually modifying the LSA space on the basis of new words and documents as they become available, where the new words and documents represent changes in either the domain or style of composition. As a result, any change in domain and/or style gradually gets reflected in the evolution of the LSA space, so that even new documents that do not closely conform to the training corpus (e.g. documents that contain several new words) can still be successfully processed.

Among other advantages, latent semantic adaptation implemented in accordance with the method of the present invention accommodates new documents of virtually any size and number, is capable of taking advantage of out-of-vocabulary words present in the new documents, and is computationally efficient since it does not require re-computation of the LSA space or multiple matrix inversions. The latent semantic adaptation of the present invention is applicable to all applications of LSA, including semantic inference, dictation, information retrieval, and word and document clustering.

FIG. 1 is a block diagram that illustrates the use of latent semantic adaptation in accordance with one embodiment of the present invention, in the context of an LSA application using semantic inference in a speech recognition system 100. A speech recognition unit 104 receives an audio input 102 and, using acoustic models 106 and a language model 108, generates a sequence of words and documents 110. The audio input 102 is audio data that is input to the speech recognition system 100 and is intended to represent any type of audio data. Typically, the audio input 102 is a digitized representation of a human voice.

According to one embodiment of the present invention, the acoustic models 106 are hidden Markov models. Alternate embodiments can use different types of acoustic models, and of any of a variety of conventional acoustic models other than hidden Markov models can be used. According to one embodiment of the present invention, the language model 108 is a context-free grammar, such as a finite state grammar, that is a compact way of representing an exhaustive list of each and every word that the speech recognition system 100 can recognize. Alternate embodiments of system 100 can use different types of language models, including a conventional n-gram statistical language model (such as a bigram model, where n=2), where the probability of every word depends only on the n−1 previous words. Hidden Markov models, n-gram language models, and context-free grammars are well-known to those skilled in the art and thus will not be discussed further except as they pertain to the present invention.

An adapted LSA space derivation unit 111 receives the sequence of words and documents 110 and, using an LSA space 114, derives corresponding word and document vectors to adapt the LSA space 114 to reflect any changes in domain and/or style of the underlying language composition. The LSA space 114 is a continuous vector space previously constructed from word and document vectors, referred to as semantic anchors 113, computed from a correlation matrix of word-document co-occurrences in a training corpus of words and documents representative of a particular domain and style of language composition.

A semantic classification unit 112 receives the sequence of words and documents 110 and uses semantic inference to classify the sequence of words and documents 110 by determining the correlation between the sequence of words and documents 110 and one or more semantic anchors 113 present in the adapted LSA space 114. The correlation is the similarity between a vector corresponding to the sequence of words and documents 110 and the vectors corresponding to the semantic anchors 114 as determined by using a similarity measure. The semantic classification unit 112 classifies the sequence of words and documents 110 as corresponding to the semantic anchor 113 with the closest correlation. The semantic classification unit 112 sends a semantic representation 116 of the classified sequence of words and documents 110 to an application unit 118. The application unit 118 receives the semantic representation 116 and generates an application output 120.

The application unit 118 uses the semantic representation 116 to determine the application output 120 that is generated in response to the audio input 102. It should be noted that the speech recognition system 100 as described herein is used for illustrative purposes only, and there may be any number of other applications other than semantic inference for using the latent semantic adaptation of the present invention, including dictation, information retrieval, and word and document clustering applications. Such applications are well known to those skilled in the art, and thus will not be discussed further except as they pertain to the present invention.

Figure 2:
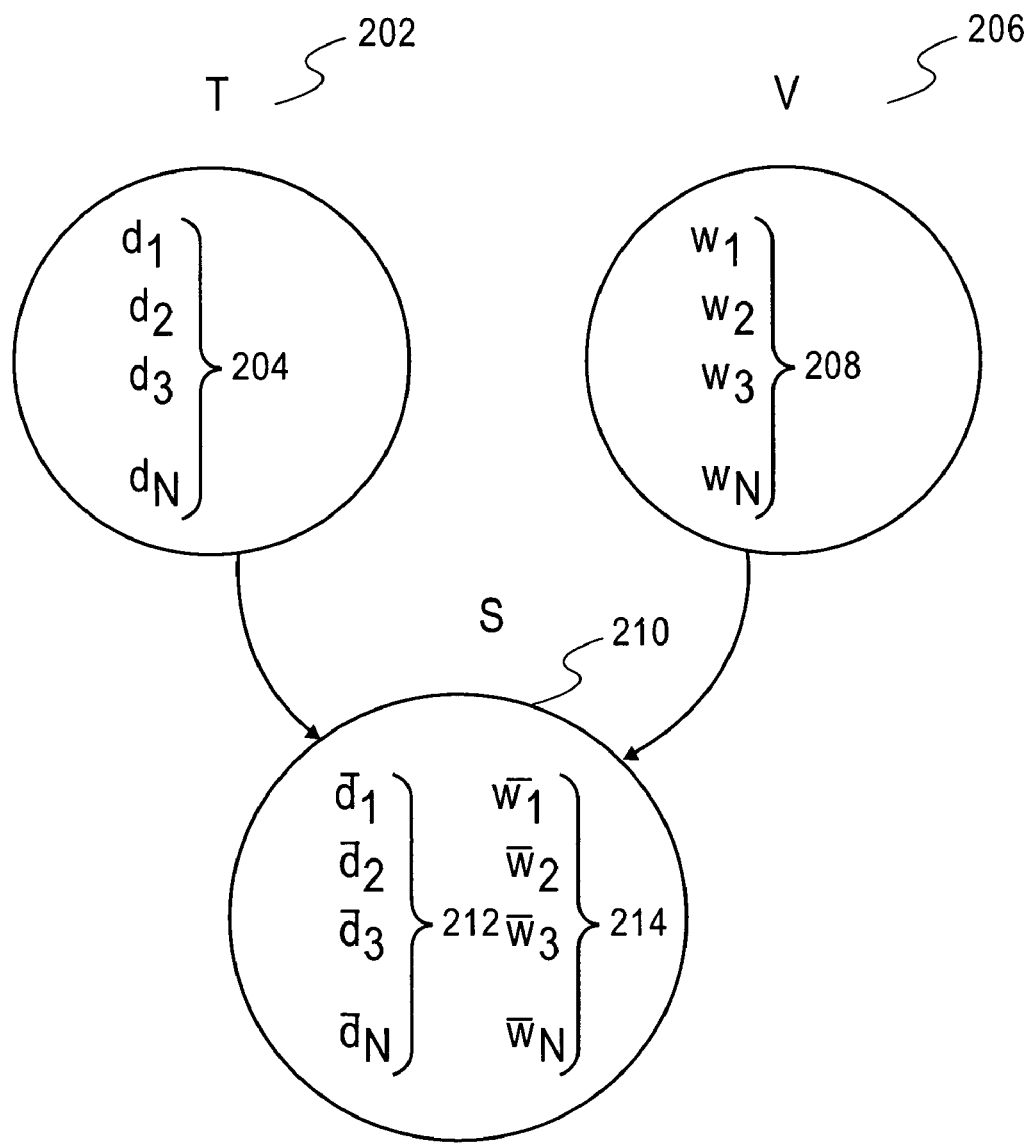
FIG. 2 is a block diagram overview of some of the components of latent semantic analysis (LSA), in accordance with one embodiment of the present invention.

FIG. 2 illustrates an overview of some of the components underlying LSA. As explained in more detail in FIG. 3, the basic LSA paradigm defines a mapping between a training text corpus $\mathcal{T}$ 202, i.e., a collection of N documents of interest, $d_1, d_2, \ldots d_N$ 204, the underlying vocabulary $\mathcal{V}$ 206, $|\mathcal{V}|=M$, i.e., the set of all the words $w_1, w_2, \ldots w_M$ 208 appearing in the documents in $\mathcal{T}$, and a continuous vector space $\mathcal{S}$ 210, whereby each word in $\mathcal{V}$ 206 and each document in $\mathcal{T}$ 202 is represented by a vector $\bar{d}_1 \ldots \bar{d}_N, \bar{w}_1 \ldots \bar{w}_M$ 212/214 in $\mathcal{S}$ 210. If $\mathcal{T}$ 202 is representative of general English, for example, then $\mathcal{V}$ 206 would be the M most frequent words in the language. Typically, M is on the order of a few thousand, and, depending on the application, N varies between a few hundred and several million documents; $\mathcal{T}$ 202 might comprise up to a billion words of text.

The continuous vector space $\mathcal{S}$ 210 is semantic in nature, because the "closeness" of vectors in the space $\mathcal{S}$ 210 is determined by the overall pattern of the language used in the training corpus $\mathcal{T}$ 202, as opposed to specific constructs. Hence, two words whose representations are "close" (in some suitable metric) tend to appear in the same kind of documents, whether or not they actually occur within identical word contexts in those documents. Conversely, two documents whose representations are "close" tend to convey the same semantic meaning, whether or not they contain the same word constructs. More generally, word and document vectors 212/214 associated with words and documents 204/208 that are semantically linked are also "close" in the space $\mathcal{S}$ 210. On the other hand, a semantic pattern not present in the training corpus $\mathcal{T}$ 202 cannot be inferred from the space $\mathcal{S}$ 210, hence the need to adapt the space to keep semantic knowledge as current as possible.

Figure 3A:
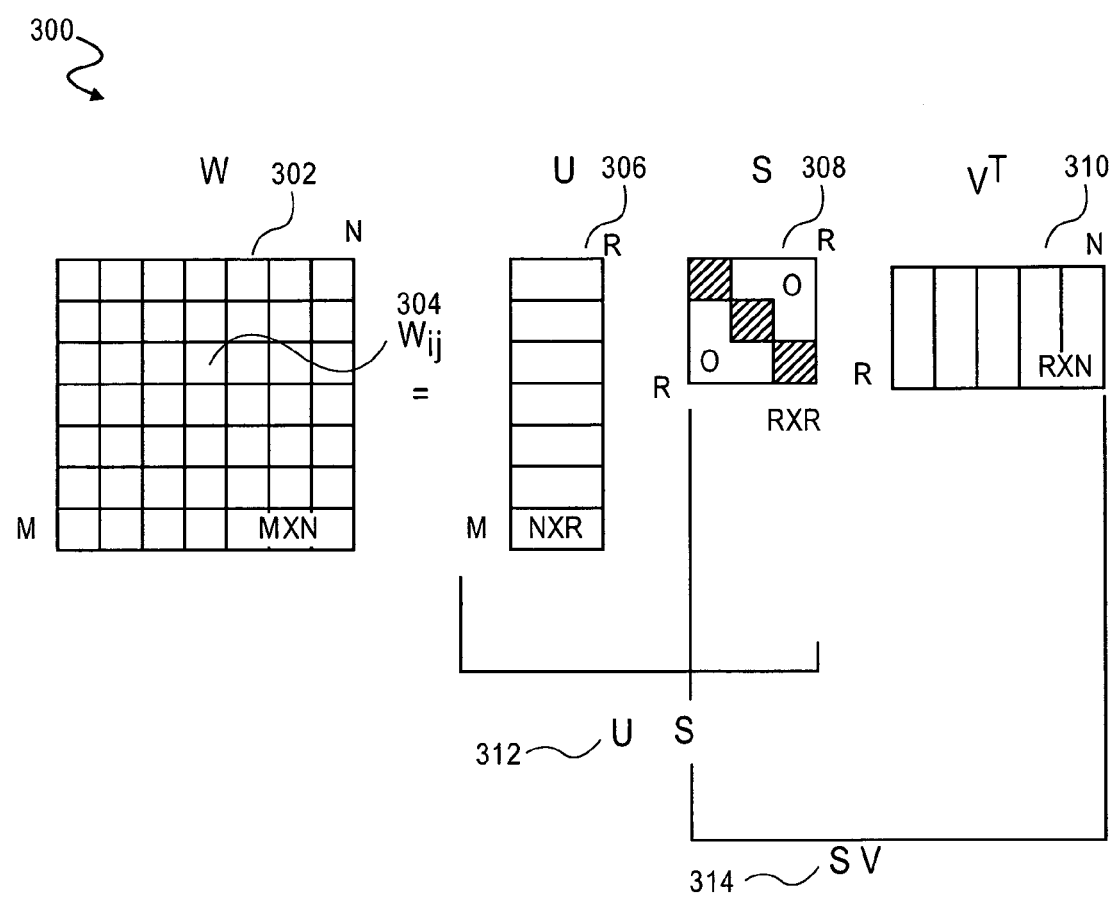
FIGS. 3A and 3B are an overview of selected components of the basic LSA paradigm, in accordance with one embodiment of the present invention.
Figure 3B:
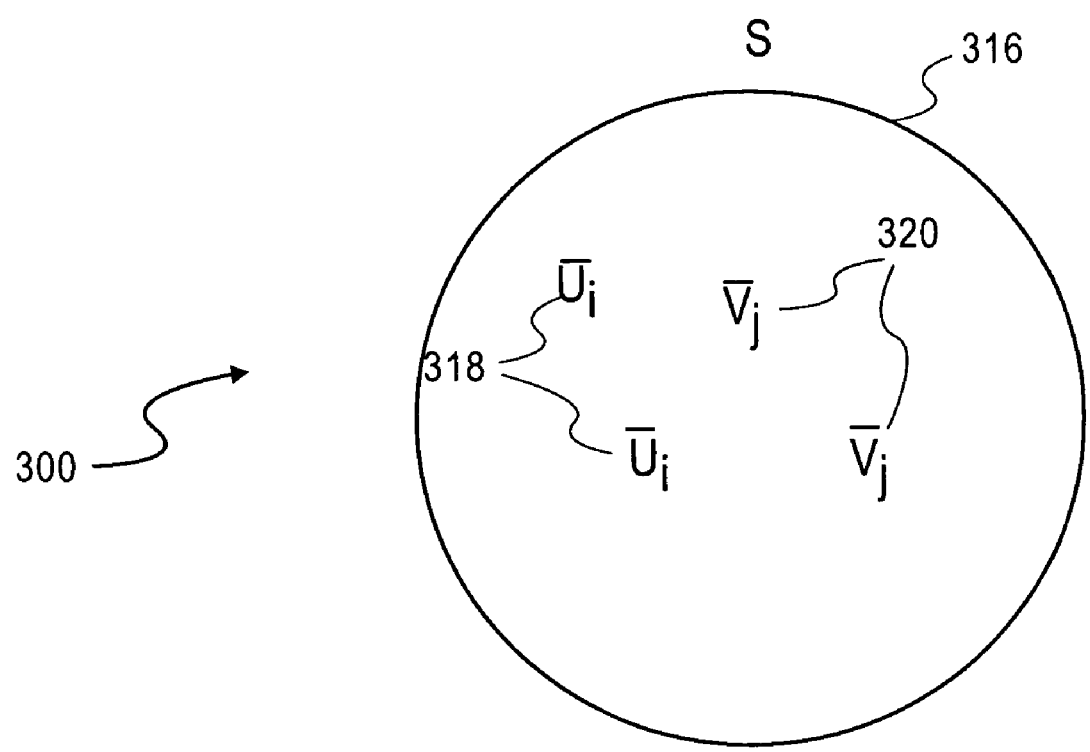

FIGS. 3A and 3B illustrate selected components of the basic LSA paradigm 300 used to construct the continuous vector space $\mathcal{S}$, referenced in FIG. 3B as LSA space $\mathcal{S}$ 316. The LSA paradigm 300 first captures the semantic patterns of the word-document co-occurrences that appeared in the training corpus $\mathcal{T}$ 202 by constructing a word-document matrix W 302 of dimension M×N, whose entries $w_{ij}$ 304 suitably reflect the extent to which word $w_i$ 208 appeared in document $d_j$ 204, and then performing a singular value decomposition (SVD) of the word-document matrix W 302 having an order of decomposition of R<<min(M,N) as in [1]:

$$W = USV^T, \quad (1)$$

where U 306 is the M×R left singular matrix of row vectors, $u_i (1 \leq i \leq M)$, S 308 is the R×R diagonal matrix of singular values $s_1 \geq s_2 \geq \ldots s_R > 0$, and $V^T$ is the transposition of V 310, the R×N right singular matrix of row vectors $v_j (1 \leq j \leq N)$. The value of R can vary depending on the values of M and N, and by balancing computational speed (associated with lower values of R) against accuracy (associated with higher values of R). Typical values for R range from 5 to 100.

As is well-known to those skilled in the art, both left and right singular matrices U 306 and V 310 are column-orthonormal, i.e., $U^T U = V^T V = I_R$ (the identity matrix of order R). Thus, the column vectors of matrices U 306 and V 310 each define an orthonormal basis for the space of dimension R spanned by the $u_i$'s and $v_j$'s. This is the LSA space S316, in which the scaled row vectors $\bar{u}_i = u_i S$ 318 and $\bar{v}_j = v_j S$ 320 (i.e. the rows of US 312 and VS 314) characterize the position of word $w_i$ and document $d_j$. For this reason, $\bar{u}_i$, 318 and $\bar{v}_j$ 320 are referred to as a word vector and a document vector, respectively.

Given the SVD from calculation (1), a particular document $d_j$ 204 in W 202 can be determined based on the jth right singular vector v, according to the following calculation:

$$d_j = USv_j^T \quad (2)$$

Further, based on calculation (2) and using well-known mathematical functions and properties, the value of the jth right singular vector $v_j$ can be calculated according to the following:

$$v_j = d_j^T US^{-1} \quad (3)$$

It is to be appreciated that the value $US^{-1}$ does not change for different values of j, and therefore the value $US^{-1}$ can be pre-calculated and used during the classification of new words and documents 110 referenced in FIG. 1. This pre-calculation reduces the computation required to perform the functions of the semantic classification unit 112, thereby increasing the speed of a speech recognition system 100 during operation.

However, the LSA space S316 generated by the basic LSA paradigm 300 is a fixed semantic space and must eventually be re-trained to keep pace with additions and changes not only to the domain, i.e. the underlying vocabulary ᵥ206, but also to changes in the style of the documents. Otherwise, the semantic classification error rate of the semantic classification unit 112 begins to increase as the new words and documents 110 vary from those contained in the original training corpus ᵧ202. However, re-training by re-computing the LSA space S316 generated by the basic LSA paradigm 300 is too computationally intensive to be of practical use.

Figure 4A:
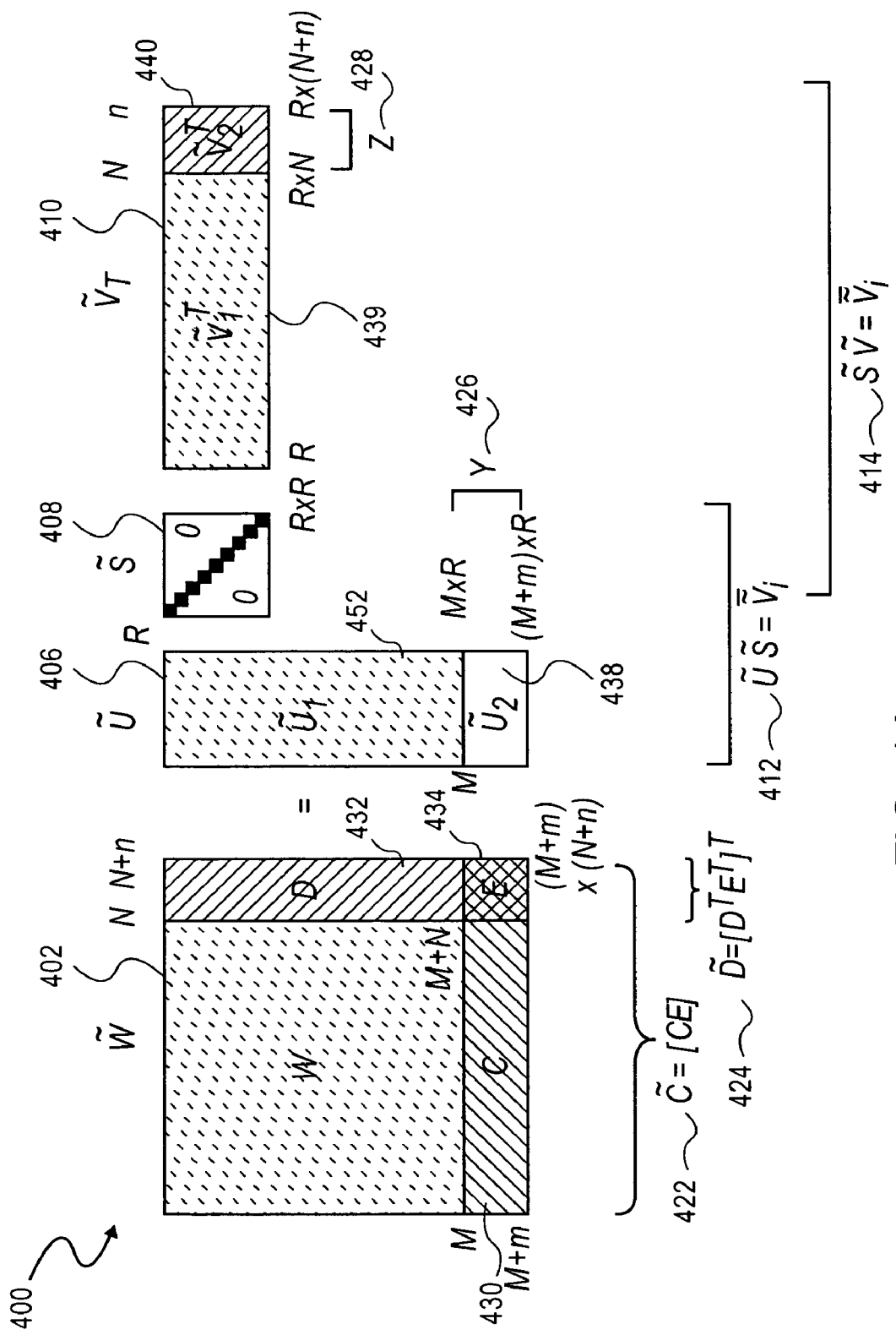
FIGS. 4A and 4B are an overview of selected components of the adaptive LSA paradigm, in accordance with one embodiment of the present inventions.
Figure 4B:
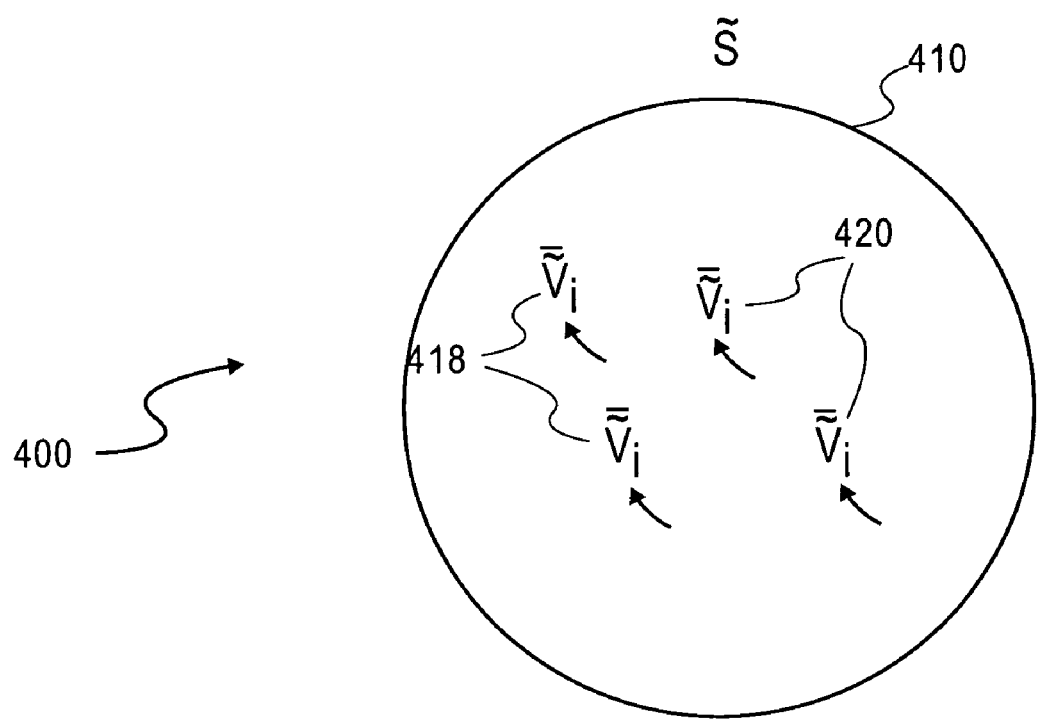

FIGS. 4A and 4B illustrate selected components of the adaptive LSA paradigm 400 using latent semantic adaptation in accordance with an embodiment of the present invention. The adaptive LSA paradigm 400 extends the basic LSA paradigm 300 so that some or all of the data in new documents 110 are taken into account through incremental adaptation of the original LSA space S316 in a way that is computationally efficient. Adaptation of the original LSA space S316 insures that the semantic classification error rate of the semantic classification unit 112 does not substantially increase as the new words and documents 110 vary from those contained in the original training corpus ᵧ202.

The adaptive LSA paradigm 400 relies on two assumptions. The first assumption is that the dimension R of the original LSA space S316 is low enough that none of the corresponding R singular values are zero. This is typically the case since the basic LSA paradigm 300 seeks to operate at the maximum possible dimensionality reduction to increase computational speed without sacrificing accuracy. The second assumption is that the transformation necessary to adapt the original LSA space S316 is invertible. If it was not, then a rather pathological situation would arise: the inability to go back to the original LSA space S316 by simply forgetting the new data.

With reference to FIG. 4A, if n additional documents contain words drawn from the original underlying vocabulary V 206 plus m words previously unseen (i.e. out-of-vocabulary words), then the adaptive LSA paradigm 400 constructs a word-document matrix $\tilde{W}$ 402 of dimension (M+m)×(N+n) in the same manner as described for generating matrix W 202 in the basic LSA paradigm 300 in FIGS. 3A and 3B. Using the same order of decomposition R, the SVD of $\tilde{W}$ 402 leads to:

$$\tilde{W} = \tilde{U}\tilde{S}\tilde{V}^T, \quad (4)$$

where $\tilde{U}$ 406 is the left singular matrix of dimension (M+m)×R, $\tilde{S}$ 408 is the diagonal matrix of dimension R×R, and $\tilde{V}$ 410 is the right singular matrix of dimension (N+n)× R, each having the same definitions and properties as described above for W, U, S, and V in FIGS. 3A and 3B.

As shown in FIG. 4A, the m new words are gathered in the m×(N+n) matrix $\tilde{C} = [CE]$ 422, the n new documents are gathered in the (M+m)×n matrix $\tilde{D} = [D^T E^T]^T$ 424. $\tilde{U}$ 406 is expressed as $[\tilde{U}_1^T \tilde{U}_2^T]^T$, where $\tilde{U}_1^T$ 436 is the transposition of the left singular matrix of dimension M×R and $\tilde{U}_2^T$ 438 is the transposition of the left singular matrix of dimension m×R. $\tilde{V}^T$ 410 is expressed as $[\tilde{V}_1^T \tilde{V}_2^T]$ where $\tilde{V}_1^T$ 439 is the transposition of the right singular matrix of dimension R×N and $\tilde{V}_2^T$ 440 is the transposition of the right singular matrix of dimension R×n. The new decomposition of $\tilde{W}$ expressed in (4) leads to a different LSA space ᴤ416, in which the word and document vectors are now given by the scaled row vectors $\tilde{\bar{u}}_i = \tilde{u}_i \tilde{S}$ 418 and $\tilde{\bar{v}}_j = \tilde{v}_j \tilde{S}$ 420 (i.e. the rows of $\tilde{U}\tilde{S}$ 412 and $\tilde{V}\tilde{S}$ 414) to characterize the position of word $w_i$ and document $d_j$.

Figure 7A:
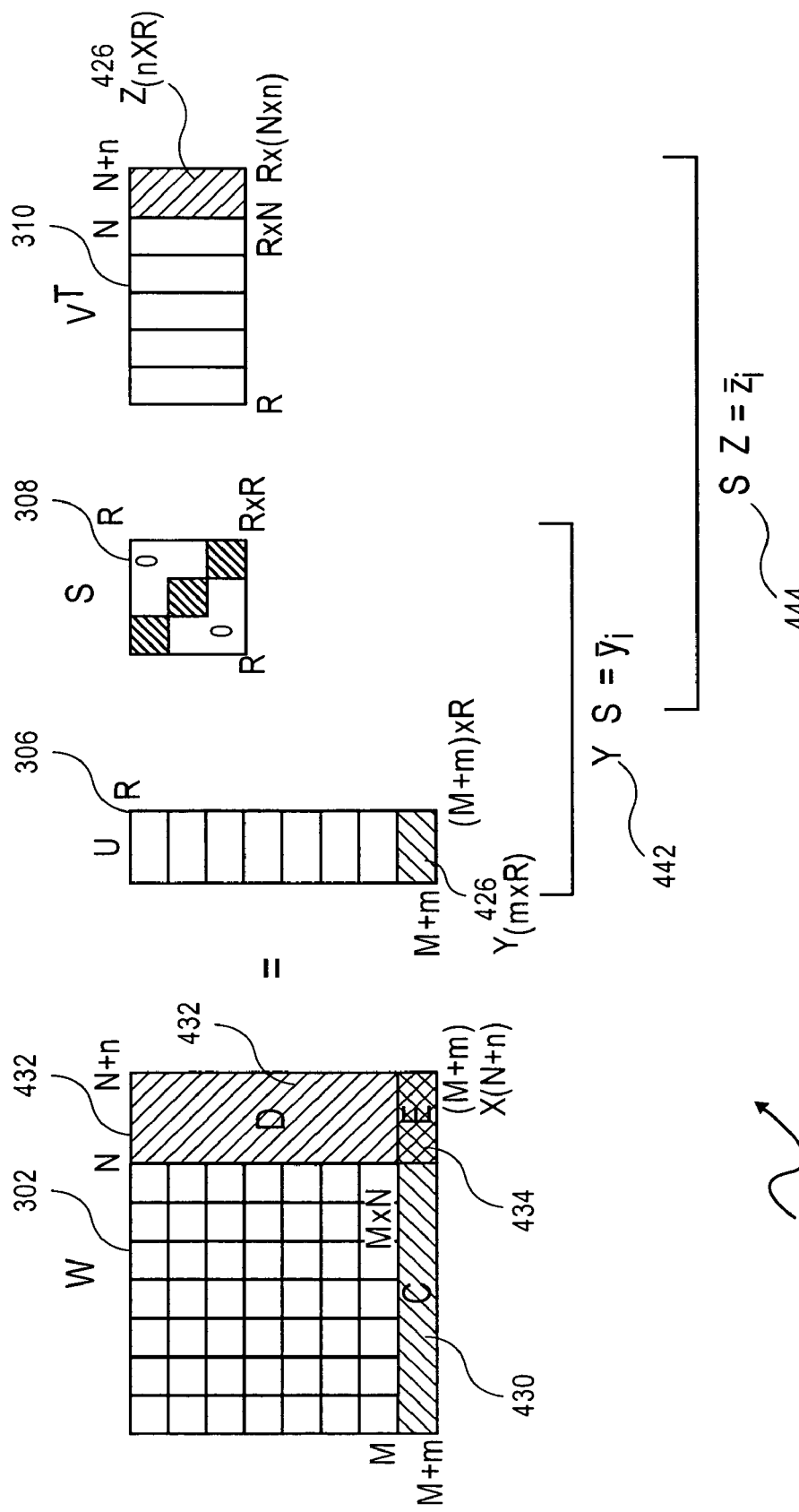
FIGS. 7A and 7B are an overview of selected components of prior art baseline adaptation.
Figure 7B:
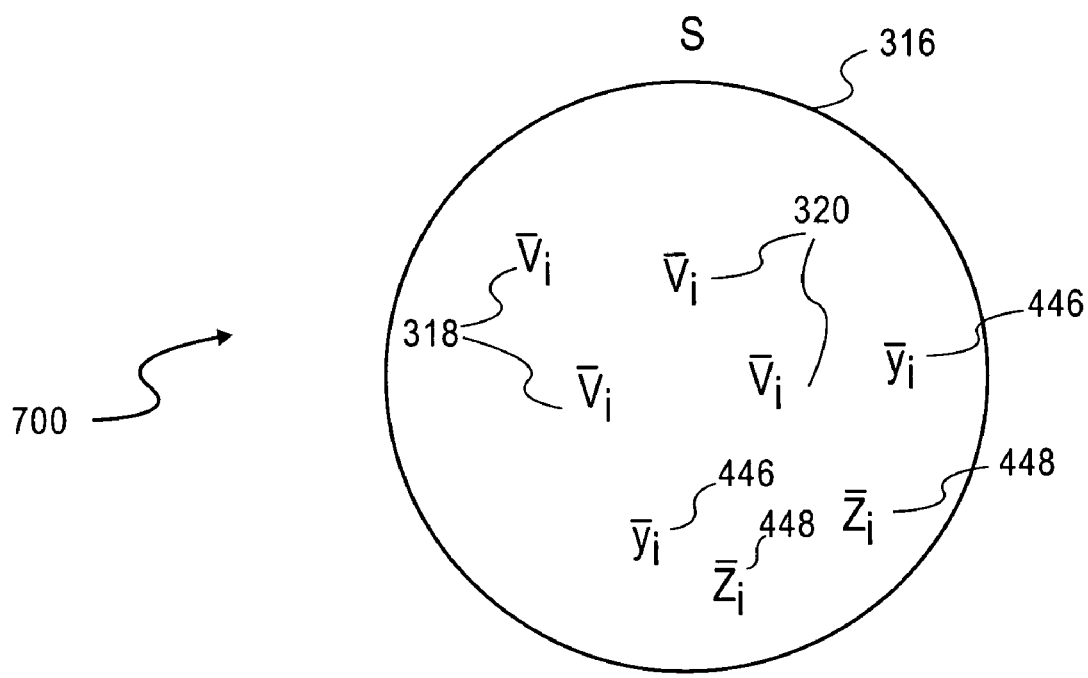

FIGS. 7A and 7B illustrate the prior art approach referred to as baseline adaptation 700, where the distinction between the SVD in (1) of the original word-document co-occurrence matrix W 302 in FIG. 3A and the SVD in (4) of the extended word-document co-occurrence matrix $\tilde{W}$ 402 in FIG. 4A is ignored by making the (obviously invalid) assumption that the original LSA space S316 in FIG. 3B is the same as the new LSA space ᴤ416 in FIG. 4B. In other words, in baseline adaptation 700, the SVD in (1) is still assumed to be valid even after the new documents become available, and the problem is reduced to representing the new data in the original LSA space S316.

Referring now to FIGS. 4A and 7B, the baseline adaptation approach 700 treats the portions of the matrix $\tilde{W}$ 402 identified as C 430 and D 432 as merely extensions of additional rows or columns of the original matrix W 302, and discards altogether the portion of the extended matrix $\tilde{W}$ 402 identified as E 434. This has the effect of ignoring significant amounts of new data, including any out-of-vocabulary words in the new documents.

Using the baseline adaptation approach 700, the representation of those portions of the new data that will be added to the original LSA space $\tilde{S}$316 is obtained from the SVD of as C 430 and D 432 as follows:

$$C = YSV^T, \quad (5)$$

$$D = USZ^T, \quad (6)$$

where the m×R matrix Y 426 and the n×R matrix Z 428 are defined a posteriori (as plug-ins), to satisfy the relationship. In essence, using the baseline adaptation framework 700, the role of matrices Y 426 and Z 428 is to "extend" the original matrices U 306 and V 310 to accommodate the new data. The original word and document vectors $\bar{u}_i$ 318 and $\bar{v}_j$ 320 are still given by the rows of US 312 and VS 314, but the new word and document vectors $\bar{y}_i$ 446 and $\bar{z}_j$ 448 are given by the rows of YS 442 and ZS 444, respectively. From (5) and (6), these are seen to be:

$$YS = CV, \quad (7)$$

$$ZS = D^T U. \quad (8)$$

The effect, illustrated in FIG. 7B, is that the original LSA space $\tilde{S}$316 becomes populated with the new data, i.e. the new word and document vectors $\bar{y}_i$ 446 and $\bar{z}_j$ 448, hence the name "folding-in."

A major drawback to the above-described baseline adaptation approach 700 illustrated in FIG. 7B is poor performance, since even when populated with the new word and document vectors $\bar{y}_i$ 446 and $\bar{z}_j$ 448, the misclassification error rate using the original LSA space $\tilde{S}$316 is still high when the new words and documents vary from the original training corpus 7202, e.g. when the new documents contain several new words not in the original training corpus.

In contrast, the latent semantic adaptation approach of the present invention achieves significant reductions in the misclassification error rate. Unlike baseline adaptation 700, the latent semantic adaptation approach of the present invention recognizes that there is an important distinction between the SVD in (1) of the original word-document co-occurrence matrix W 302 in FIG. 3A and the SVD in (4) of the extended word-document co-occurrence matrix $\tilde{W}$ 402 in FIG. 4A that must be taken into account since the original LSA spaces $\tilde{S}$316 in FIG. 3B is not the same as the new LSA space $\tilde{s}$416 in FIG. 4B. In other words, the SVD in (1) is no longer valid after the new documents become available, so the problem is more than just representing the new data in the original LSA space $\tilde{S}$316. Therefore, in one embodiment, the latent semantic adaptation approach treats the portions of the matrix $\tilde{W}$ 402 identified as C 430 and/or D 432 in FIG. 4A as new data that must be accounted for in a new LSA space $\tilde{s}$416. In one embodiment, the portion of the matrix $\tilde{W}$ 402 identified as E 434 in FIG. 4A is also treated as new data that must be accounted for in a new LSA space $\tilde{s}$416.

In one embodiment of latent semantic adaptation, the scaled row vectors (i.e. the rows of $\tilde{U}\tilde{S}$ 412 and $\tilde{V}\tilde{S}$ 414) are obtained directly from the SVD of the entire matrix $\tilde{W}$ 402 in (4) using a latent semantic adaptation framework 400 as defined in the equations that follow. By inspection from FIG. 4A, $$C = \tilde{U}_2 \tilde{S} \tilde{V}_1^T, \quad (9)$$

$$D = \tilde{U}_1 \tilde{S} \tilde{V}_2^T, \quad (10)$$

and $$W = \tilde{U}_1 \tilde{S} \tilde{V}_1^T, \quad (11)$$

$$E = \tilde{U}_2 \tilde{S} \tilde{V}_2^T, \quad (12)$$

each of which are column-orthonormal, i.e., $\tilde{U}^T \tilde{U} = \tilde{V}^T \tilde{V} = I_R$ (the identity matrix of order R). The orthogonality constraints can also be expressed in terms of $\tilde{U}_1$, $\tilde{U}_2$, $\tilde{V}_1$, and $\tilde{V}_2$ as follows:

$$\tilde{U}^T \tilde{U} = I_R = \tilde{U}_1^T \tilde{U}_1 + \tilde{U}_2^T \tilde{U}_2, \quad (13)$$

$$\tilde{V}^T \tilde{V} = I_R = \tilde{V}_1^T \tilde{V}_1 + \tilde{V}_2^T \tilde{V}_2. \quad (14)$$

In one embodiment, the foregoing equations (9)–(14) define the latent semantic adaptation framework 400 of the method of the present invention. The latent semantic adaptation framework 400 is used to solve for the "extension" SVD matrices $\tilde{U}$ 406, $\tilde{S}$ 408, and $\tilde{V}$ 410 as a function of the original SVD matrices U 306, S 308, V 310, and "extension" SVD matrices Y 426, and Z 428.

Figure 5A:
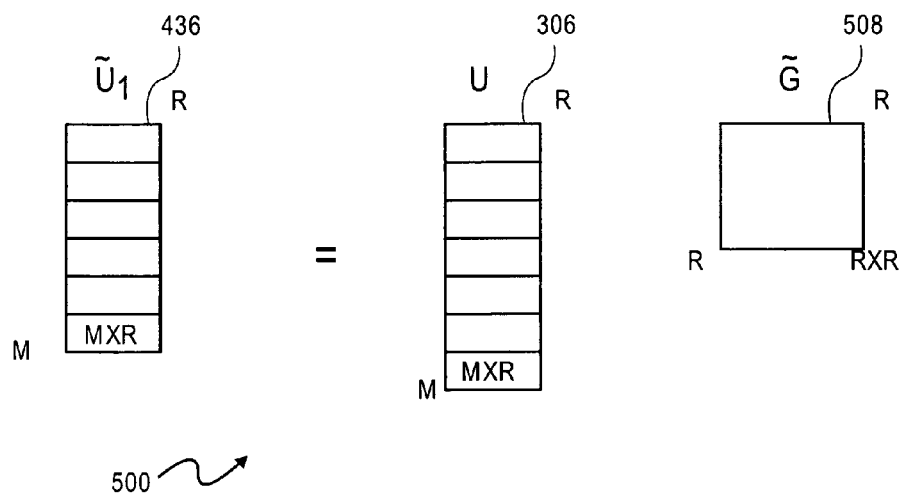
FIGS. 5A and 5B are an overview of selected components of the matrix transformation of the adaptive LSA paradigm, in accordance with one embodiment of the present invention.
Figure 5B:
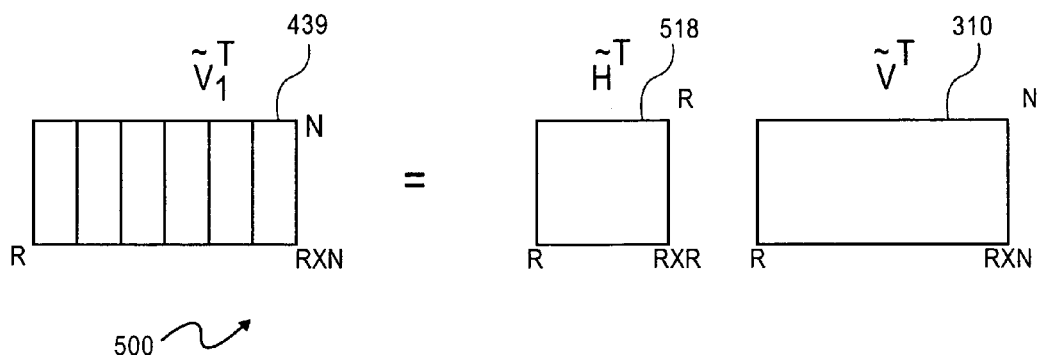

According to one embodiment, the solution is obtained by setting up a latent semantic adaptation transformation 500, as illustrated in FIGS. 5A and 5B, based on the assumptions previously noted that the dimension R of the original LSA space $\tilde{S}$316 is low enough that none of the corresponding R singular values are zero, and that the transformation necessary to adapt the original LSA space $\tilde{S}$316 is invertible. Starting with $\tilde{S}$ 408, the shift from S 308 in FIG. 3A to $\tilde{S}$ 408 in FIG. 4A can be captured as illustrated in FIGS. 5A and 5B by the following expressions:

$$\tilde{U}_1 = U\tilde{G}, \quad (15)$$

$$\tilde{V}_1 = V\tilde{H}, \quad (16)$$

where $\tilde{G}$ 508 and $\tilde{H}$ 518 are (R×R) matrices that, according to the second assumption, are assumed to be invertible. Taken together, (15) and (16) define a latent semantic adaptation matrix transformation 500 to apply to the original SVD matrices U 306 and V 310 to update them according to the new data.

It is fairly straightforward to show that matrix transformation 500 also applies to the "extension" SVD matrices Y 426, and Z 428 resulting from the "folding-in" process, designated in FIG. 4 as $\tilde{U}_2$ 438 and $\tilde{V}_2$ 440, respectively. Specifically, first note that (1) and (11), together with (15) and (16) and the orthogonality properties of U and V, lead to:

$$S = \tilde{G}\tilde{S}\tilde{H}^T \quad (17)$$

Since matrices $\tilde{G}$ 508 and $\tilde{H}$ 518 are invertible and, in accordance with the first assumption, since both S 308 and $\tilde{S}$ 408 are assumed to contain no zero singular value, implies the following equivalent identities:

$$\tilde{G} = S\tilde{H}^{-T}\tilde{S}^{-1}, \quad (18)$$

$$\tilde{H} = S\tilde{G}^{-T}\tilde{S}^{-1}, \quad (19)$$

where the latter identity exploits the fact that S 308 and $\tilde{S}$ 408 are diagonal.

On the other hand, equations (5) and (9), together with (16), can be expressed as:

$$YS = \tilde{U}_2 \tilde{S} \tilde{H}^T, \quad (20)$$

while equations (6) and (10), together with (15) yield:

$$SZ^T = \tilde{G}\tilde{S}\tilde{V}_2^T. \quad (21)$$

Thus, exploiting equation (18) in (20) and equation (19) in (21), $\tilde{U}_2$ 438 and $\tilde{V}_2$ 440 can be obtained, after re-arranging, as:

$$\tilde{U}_2 = Y\tilde{G}, \tag{22}$$

$$\tilde{V}_2 = Z\tilde{H}. \tag{23}$$

Equations (22)–(23) provide a convenient way to express the "extension" SVD matrices $\tilde{U}$ 406 and $\tilde{V}$ 410 in terms of the matrices $\tilde{G}$ 508 and $\tilde{H}$ 518 of the latent semantic adaptation matrix transformation 500 postulated in expressions (15)–(16), as follows:

$$\tilde{U} = \begin{bmatrix} U \\ Y \end{bmatrix} \tilde{G}, \tag{24}$$

$$\tilde{V} = \begin{bmatrix} V \\ Z \end{bmatrix} \tilde{H}. \tag{25}$$

The issue is now to solve for matrices $\tilde{G}$ 508 and $\tilde{H}$ 518 as a function of the original entities.

The first step in solving for matrices $\tilde{G}$ 508 and $\tilde{H}$ 518 is to take advantage of equations (15)–(16) and (24)–(25) in (13)–(14). The orthogonality properties of U 306 and V 310 are used to obtain:

$$\tilde{G}^T(I_R + Y^TY)\tilde{G} = I_R, \tag{26}$$

$$\tilde{H}^T(I^R + Z^TZ)\tilde{H} = I_R. \tag{27}$$

Again invoking the assumption regarding the non-singularity of matrices $\tilde{G}$ 508 and $\tilde{H}$ 518, equations (26)–(27) may be re-written as:

$$\tilde{G}^{-T}\tilde{G}^{-1} = (\tilde{G}\tilde{G}^T)^{-1} = (I_R + Y^TY), \tag{28}$$

$$(\tilde{H}^{-T}\tilde{H}^{-1} = (\tilde{H}\tilde{H}_T)^{-1} = (I_R + Z^TZ), \tag{29}$$

or, equivalently:

$$(\tilde{G}\tilde{G}^T) = (I_R + Y^TY)^{-1}, \tag{30}$$

$$(\tilde{H}\tilde{H}^T) = (I_R + Z^TZ)^{-1} \tag{31}$$

Equations (30)–(31) can in turn be used to derive $\tilde{G}$ 508 as a function of "extension" SVD matrix Y 426, and $\tilde{H}$ 518 as a function of "extension" SVD matrix Z 428. Note that the inverse appearing in the right hand side of equations (30) and (31) may not have to be computed directly. Recall the well-known matrix identity:

$$(A + P^TQ)^{-1} = A^{-1} - (A^{-1}P^T)(I + QA^{-1}P^T)^{-1}(QA^{-1}), \tag{32}$$

for any nonsingular (square) matrix A and matrices P, Q with compatible dimensions. Applied to (30)–(31), this results in:

$$(\tilde{G}\tilde{G}^T) = I_R - Y^T(I_m + YY^T)^{-1}Y, \tag{33}$$

$$(\tilde{H}\tilde{H}^T) = I_R - Z(I_n + ZZ^T)^{-1}Z, \tag{34}$$

which may be computationally beneficial if m<R and/or n<R. Regardless of how the inverse is computed, once the right hand side is known, the computation of matrices $\tilde{G}$ 508 and $\tilde{H}$ 518 can be done efficiently through Choleski decomposition, or, in the symmetric case, through matrix square root computation.

To be able to derive the new vectors $\tilde{U}\tilde{S}$ 412 and $\tilde{V}\tilde{S}$ 414 that are to populate the new LSA space $\tilde{S}$416, the matrix $\tilde{S}$ 408 must be expressed as a function of known quantities. But observe from equations (24)–(25) that:

$$\tilde{U}\tilde{S} = \begin{bmatrix} U \\ Y \end{bmatrix} \tilde{G}\tilde{S}, \tag{35}$$

$$\tilde{V}\tilde{S} = \begin{bmatrix} V \\ Z \end{bmatrix} \tilde{H}\tilde{S}. \tag{36}$$

Thus, it is sufficient to find suitable expressions for $\tilde{G}\tilde{S}$ and $\tilde{H}\tilde{S}$.

From equations (17), (28), and (29), it is clear that:

$$(\tilde{G}\tilde{S})(\tilde{G}\tilde{S})^T = \tilde{G}\tilde{S}^2\tilde{G}^T = S\tilde{H}^{-T}\tilde{H}^{-1}S = S(I_R + Z^TZ)S, \tag{37}$$

$$(\tilde{H}\tilde{S})(\tilde{H}\tilde{S})^T = \tilde{H}\tilde{S}^2\tilde{H}^T = S\tilde{G}^{-T}\tilde{G}^{-1}S = S(I_R + Y^TY)S. \tag{38}$$

Figure 6A:
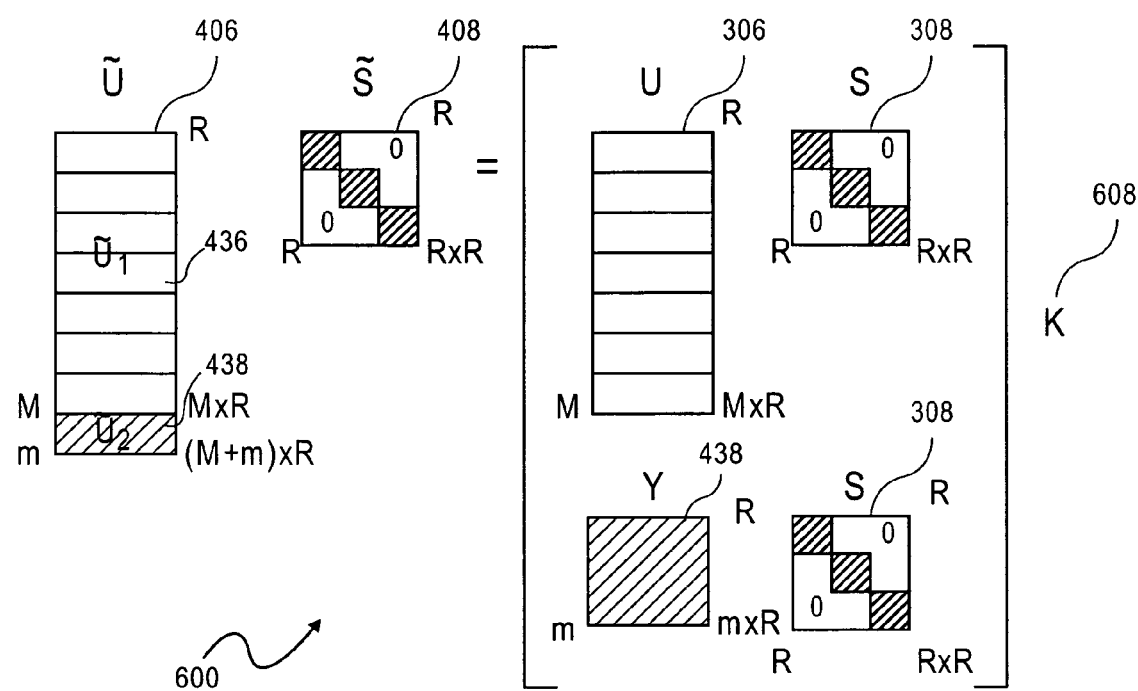
FIGS. 6A and 6B are an overview of selected components of the vector transformation of the adaptive LSA paradigm, in accordance with one embodiment of the present invention.
Figure 6B:
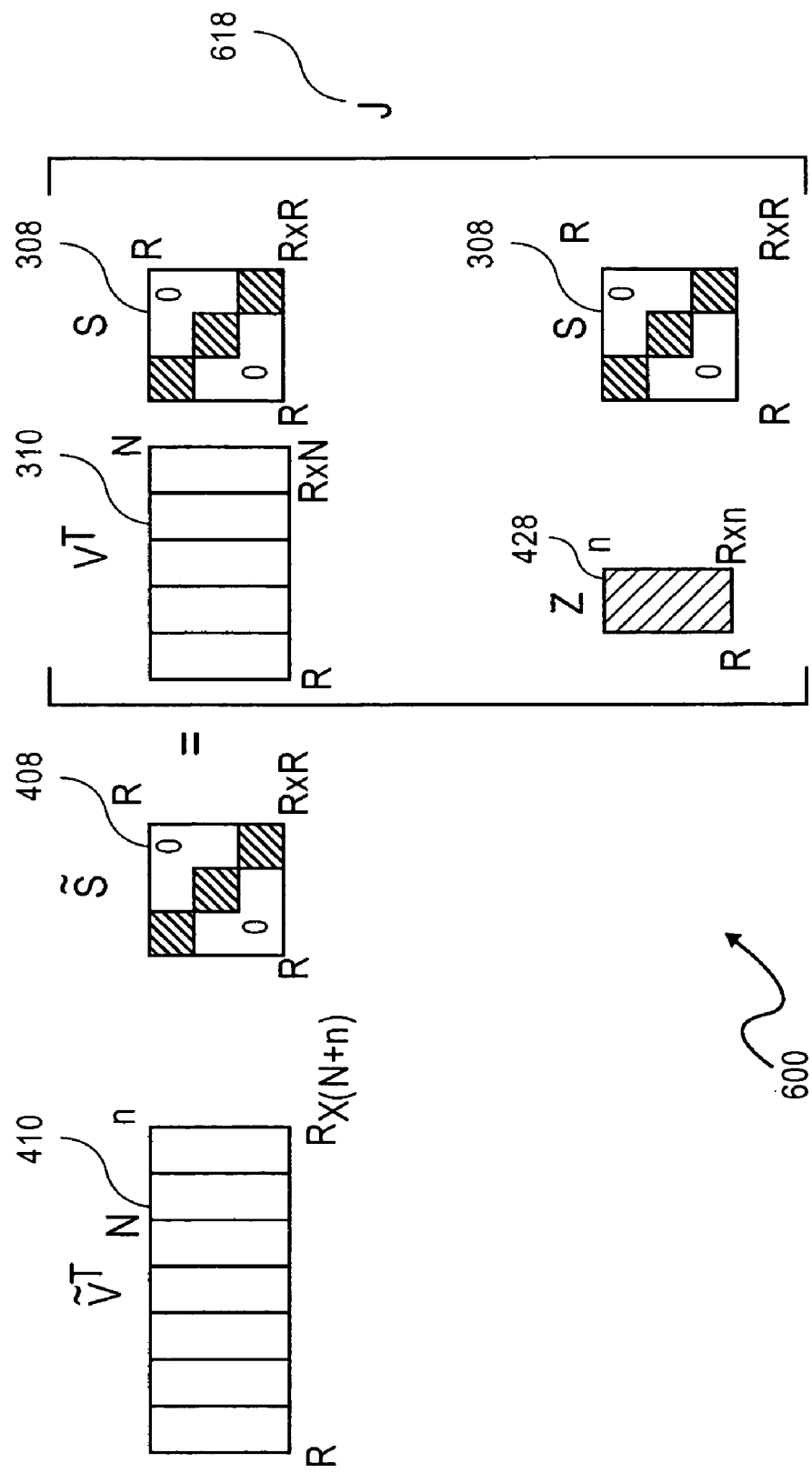

Thus, it is also possible to obtain $\tilde{G}\tilde{S}$ and $\tilde{H}\tilde{S}$ directly through Choleski decomposition, in a manner analogous to that mentioned above $\tilde{G}$ 508 and $\tilde{H}$ 518. In fact, as illustrated in FIGS. 6A and 6B, if J 618 and K 608 are the solutions of relevant Choleski decompositions, viz.:

$$JJ^T(I_R + Y^TY), \tag{39}$$

$$KK^T = (I_R + Z^TZ), \tag{40}$$

then equations (35)–(38) admit as solutions:

$$\tilde{U}\tilde{S} = \begin{bmatrix} US \\ YS \end{bmatrix} K, \tag{41}$$

$$\tilde{V}\tilde{S} = \begin{bmatrix} VS \\ ZS \end{bmatrix} J. \tag{42}$$

In other words, in accordance with one embodiment of the present invention, the original vectors US 312 and VS 314, as well as the new vectors resulting from the "folding-in" process YS 442 and ZS 444, can be transformed using a latent semantic adaptation vector transformation 600 defined by the transformation matrices K 608 in FIGS. 6A and J 618 in FIG. 6B to respectively yield the updated word vectors $\tilde{U}\tilde{S}$ 412 and document vectors $\tilde{V}\tilde{S}$ 414. Therefore, equations (41) and (42) make it possible to adapt the original LSA space $\tilde{S}$316 of FIG. 3B to the new LSA space $\tilde{S}$416 of FIG. 4B.

In one embodiment of the latent semantic adaptation framework 400, the new information, as reflected through the transformation matrices K 608 and J 618, affects both original word and document vectors $\bar{u}_i$ 318 and $\bar{v}_j$ 320 and new word and document vectors $\bar{y}_i$ 446 and $\bar{z}_j$ 448, referred to as two-sided adaptation. Stated another way, the transformed representation of the new word and document vectors $\bar{y}_i$ 446 and $\bar{z}_j$ 448 takes into account its own influence on the underlying semantic knowledge that was encapsulated in the original LSA space $\tilde{S}$316 of FIG. 3B (i.e. the existing word and document vectors $\bar{u}_i$ 318 and $\bar{v}_j$ 320) to yield the transformed word and document vectors $\bar{\bar{u}}_i$ 418 and $\bar{\bar{v}}_j$ 420 that populate the new LSA space $\tilde{S}$416 of FIG. 4B. As indicated by the arrows in the new LSA space $\tilde{S}$416 of FIG. 4B, the positions of both the words and documents represented by original word and document vectors $\bar{u}_i$ 318 and $\bar{v}_j$ 320 have shifted from their positions in the original LSA space $\tilde{S}$316 to reflect their changed position (i.e. their relationship) within the new LSA space $\tilde{S}$416. The new LSA space $\tilde{S}$416 allows not only for improvements in the misclassification error rate, but also provides the ability to adapt the speech recognition database that embodies the new LSA space $\tilde{S}416$ in real-time, because the application of the transformation matrices K 608 and J 618 is computationally efficient and bypasses the need to re-compute the LSA space.

In another embodiment of the latent semantic adaptation framework 400 of the present invention, only the new documents are considered and not the new words appearing in those new documents, referred to as one-sided adaptation. As in two-sided adaptation, one-sided adaptation does not simply "fold-in" the new documents, but rather generates a transformed representation of the new document vectors $\bar{v}_j$ 420 to generate a new LSA space $\tilde{S}416$. While not as dramatic an improvement of the misclassification rate is obtained with one-sided adaptation as can be obtained with two-sided adaptation, in certain applications of a speech recognition system 100, one-sided adaptation may be sufficient to allow for real-time adaptation of the original LSA space $S316$.

In addition to providing improved performance through lowering the misclassification rate, it is also worth noting that the latent semantic adaptation framework 400 and resulting latent semantic adaptation matrix and vector transformations 500 and 600 respectively are computationally efficient. Compared to the "folding-in" computations of the baseline adaptation approach 700, the latent semantic adaptation matrix and vector transformations 500 and 600 of the latent semantic adaptation framework 400 entail less overhead. For example, in terms of the number of floating point operations required, the overhead associated with the latent semantic adaptation vector transformations 600 embodied in equations (39)–(42) can be expressed as:

$$N_{adapt} = \tfrac{2}{3}R^3 + [(M+N)+2(m+n)-1]R^2 + (m+n+1)R. \quad (43)$$

For typical values of the various dimensions involved, expression (43) will be dominated by $(M+N)R^2$. Depending on the application, this quantity may fall anywhere between about 50 million (for voice command and control types of speech recognition applications using a limited vocabulary) and more than 1 billion (for large vocabulary transcription). Still, on current high-end machines, this quantity only represents up to a few seconds of central processor unit (CPU) time. Compared to recomputing the SVD from scratch, which requires O (MNR) operations, the computational complexity is reduced by a factor of approximately min(M,N)/R. In many speech recognition applications, the reduction factor will be on the order of 1000. In such cases, the latent semantic adaptation framework 400 and resulting latent semantic adaptation matrix and vector transformations 500 and 600 make it practical to adapt the new LSA space $\tilde{S}416$ with real-time word and document updates, whereas SVD re-computation would generally not be feasible.

In some embodiments of the latent semantic adaptation framework 400 of the present invention it may be better to proceed separately in the estimation of the scaled row vectors $\tilde{U}\tilde{S}$ 412 and $\tilde{V}\tilde{S}$ 414 (or possibly, the transformation matrices $\tilde{G}$ 508 and $\tilde{H}$ 518) that comprise the transformed word and document vectors $\bar{u}_i$ 418 and $\bar{v}_j$ 420 respectively, while in other embodiments it may be better to first compute one and then use the results to compute the other. The choice depends on what piece of evidence can be considered the most reliable.

For example, in speech recognition applications for dictation it is likely that the new data would be primarily new documents, with a few occasional new words. This is because the vocabulary there is very large (e.g., 60,000 words), so most of the words in a new document (e.g., letter) would already be known. In speech recognition applications for command and control, on the other hand, the vocabulary is more limited, so it is likely that the new data would contain new words. In the context of semantic inference, for example, the same command can be expressed in alternative ways, using different words, e.g. "make a new spreadsheet" when the pre-defined wording of the command is "Open Microsoft Excel."

In one embodiment, if the new data primarily involves adding new documents, then both matrix D 432 and matrix E 434 would be reliable starting points since they contain the new document and new word data for the new documents, while matrix C 430 might not, since it contains only the new word data. In that case, it follows that "extension" SVD matrix Z 428 (computed from equation (8)) is more reliable than "extension" SVD matrix Y 426 (computed from equation (7)), which means that transformation matrix K 618 is more reliable than transformation matrix J 608. Consequently, it is better to first compute the transformed word vectors $\bar{u}_i$ 418 from $\tilde{U}\tilde{S}$ 412 using the transformation matrix K 618 in equation (41). Instead of computing "extension" SVD matrix Y 426 from the less reliable matrix C 430 in equation (7), "extension" SVD matrix Y 426 can now be obtained from equation (44) as:

$$E = YSZ^T, \quad (44)$$

which, in turn, implies:

$$Y = EZ(Z^TZ)^{-1}S^{-1}. \quad (45)$$

Thus, if the new data primarily involves adding new documents, then "extension" SVD matrix Y 426, i.e. the new word data, can be secondarily obtained through (45) for use in (39) and then (42), which completes the transformation.

On the other hand, in an alternate embodiment, if the new data primarily involves adding new words, then both matrices C 430 and E 434 would be reliable starting points since they contain all of the new word data for the new documents, while matrix D 432 might not, since it contains only the new document data. In that case, it follows that "extension" SVD matrix Y 426 (computed from equation (7)) is more reliable than "extension" SVD matrix Z 428 (computed from equation (8)), which means that transformation matrix J 608 is more reliable than transformation matrix K 618. In that case it is advisable to first compute the transformed document vectors $\bar{v}_j$ 420 from $\tilde{V}\tilde{S}$ 414 using transformation matrix J 608 in equation (42). Instead of computing "extension" SVD matrix Z 428 from the less reliable matrix D 432 in equation (8), "extension" SVD matrix Z 428 can now be obtained from equation (44) as:

$$Z = E^TY(Y^TY)^{-1}S^{-1}. \quad (46)$$

Equation (46) can, in turn, be used in (40) and then (41), which completes the transformation.

From the foregoing, it is apparent that equations (45) and (46) provide a convenient way to compute "extension" SVD matrix Y 426 as a function of "extension" SVD matrix Z 428, or vice versa, as necessary. It should be noted that other alterations in the order of computation of the equations of the matrix and vector transformations 500 and 600 resulting from the latent semantic adaptation framework 400 might be used to accommodate the different word and document usage characteristics of different speech recognition systems and applications without departing from the scope of the invention.

Figure 8:
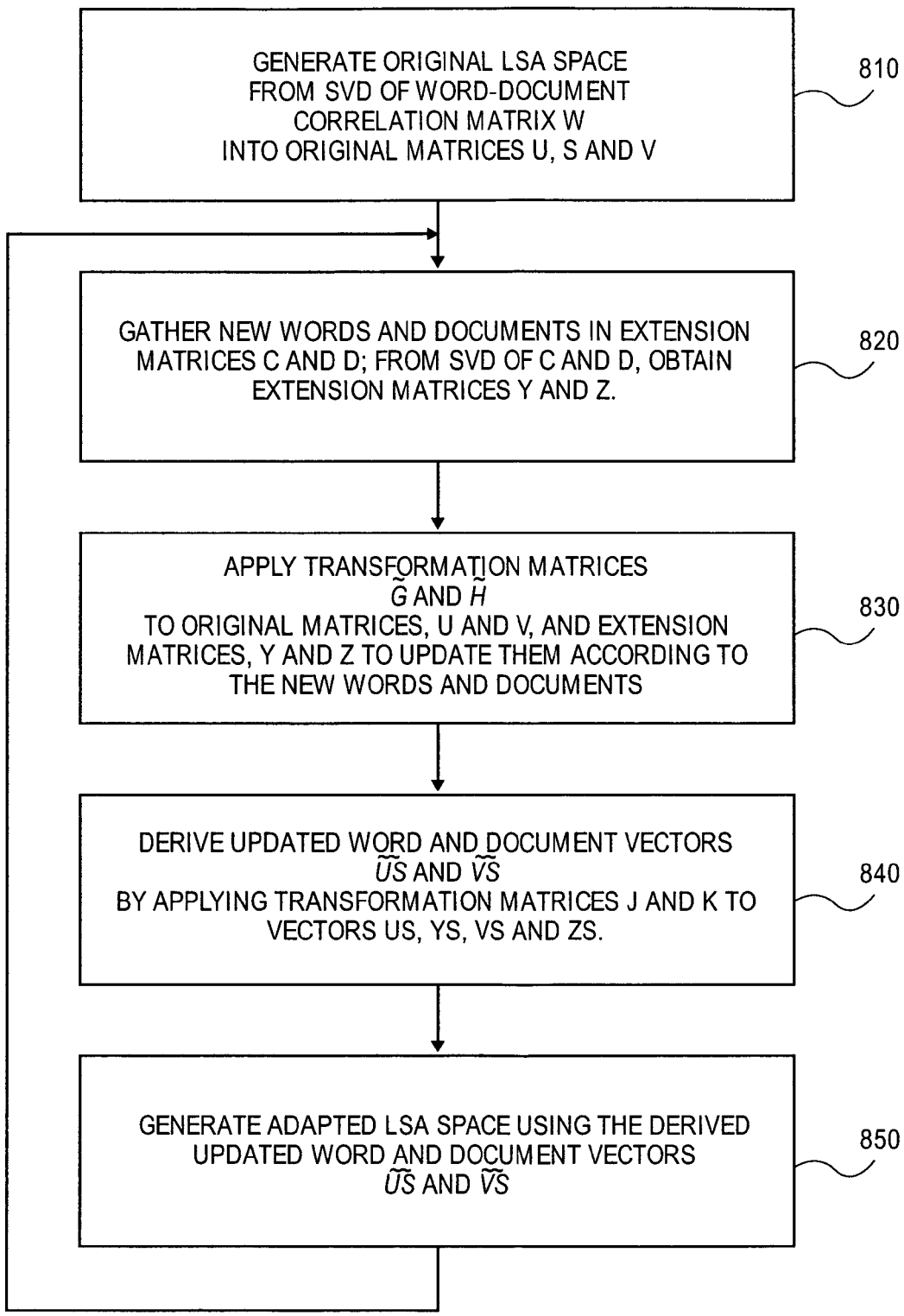
FIG. 8 is a flowchart illustrating the process followed in generating and adapting an LSA space, in accordance with one embodiment of the present invention.

Turning now to FIG. 8, the particular methods of the invention are described in terms of computer software with reference to a flowchart. The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-accessible media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application . . . ), as taking an action or causing a result. Such expressions are merely a shorthand way of saying that execution of the software by a computer causes the processor of the computer to perform an action or a produce a result.

FIG. 8 is a flowchart illustrating the process followed in using latent semantic adaptation to generate a new LSA space $\tilde{S}$416 according to one embodiment of the present invention. Initially, at process block 810, a speech recognition system 100 such as the one illustrated in FIG. 1, generates an original LSA space $S$316 from a singular value decomposition (SVD) of a word-document correlation matrix W 302 of word-document co-occurrences in a training text corpus $\mathcal{T}$202 of words and documents representative of a particular domain and style of language composition. The SVD results in original left and right singular matrices U 306 and V 310, respectively, and diagonal matrix S 308, where the rows of US 312 and VS 314 characterize the position of the words and documents of training text corpus $\mathcal{T}$202 in the original LSA space $S$316.

In one embodiment, after the training process 810 is completed, an adapted LSA space derivation unit 111 employed in the speech recognition system 100 continues at process block 820 to gather new words and documents in the extension matrices C 430, D 432 and E 434, which extend the data in the original word-document correlation matrix W 302 (i.e. the new words and documents not present in the original training text corpus $\mathcal{T}$202). Using an SVD, the adapted LSA space derivation unit 111, obtains the "extension" SVD matrices Y 426 and Z 428 which extend the original left and right singular matrices U 306 and V 310 by "folding-in" the new words and new documents, respectively.

In one embodiment, processing continues at process block 830, where the adapted LSA space derivation unit 111 may optionally apply the transformation matrices $\tilde{G}$ 508 and $\tilde{H}$ 518 to the left and right singular matrices U 306 and V 310, to update them with the new words and new documents, respectively. In addition, in one embodiment, the adapted LSA space derivation unit 111 may optionally apply transformation matrices $\tilde{G}$ 508 and $\tilde{H}$ 518 to the "extension" SVD matrices Y 426 and Z 428, to update them with the new words and documents, respectively. In normal operation, however, process block 830 is unnecessary since only the updated word and document vectors $\tilde{U}\tilde{S}$ 412 and $\tilde{V}\tilde{S}$ 414 are actually needed to generate the new LSA space $\tilde{S}$416 (as described in process block 840, below).

In one embodiment, processing continues at process block 840, where the adapted LSA space derivation unit 111 derives the updated word and document vectors $\tilde{U}\tilde{S}$ 412 and $\tilde{V}\tilde{S}$ 414 by applying the transformation matrices J 608 and K 618 to the word and document vectors US 312 and VS 314, as well as the extended word and document vectors YS 442 and ZS 444, respectively.

In general, a significant improvement in the misclassification error rate of the speech recognition system 100 is obtained by simultaneously updating both the word and document vectors. However, in some embodiments of latent semantic adaptation, the improvement may be even more significant as well as more efficient if, at processing blocks 820–840, the adapted LSA space derivation unit 111 first derives the updated word vectors $\tilde{U}\tilde{S}$ 412, and then derives the document vectors $\tilde{V}\tilde{S}$ 414, or vice versa. This is because when the new data primarily involves adding new documents, for example, the "extension" SVD matrix Y 426 can be obtained from the values already computed for E 434, Z 428, and S 308 using equation (45), whereas when the new data primarily involves adding new words, the "extension" SVD matrix Z 428, can be obtained from the values already computed for E 434, Y 426, and S 308 using equation (46). In other embodiments, it may be sufficient to process only the new documents using a one-sided adaptation approach instead of the full two-sided adaptation.

In one embodiment, processing continues at process block 850, where the adapted LSA space derivation unit 111 generates the new LSA space $\tilde{S}$416 by populating it with the newly derived updated word and document vectors $\tilde{U}\tilde{S}$ 412 and $\tilde{V}\tilde{S}$ 414 obtained at process block 840, i.e. the scaled row vectors $\tilde{u}_i$ 418 and $\tilde{v}_j$ 420.

Figure 9:
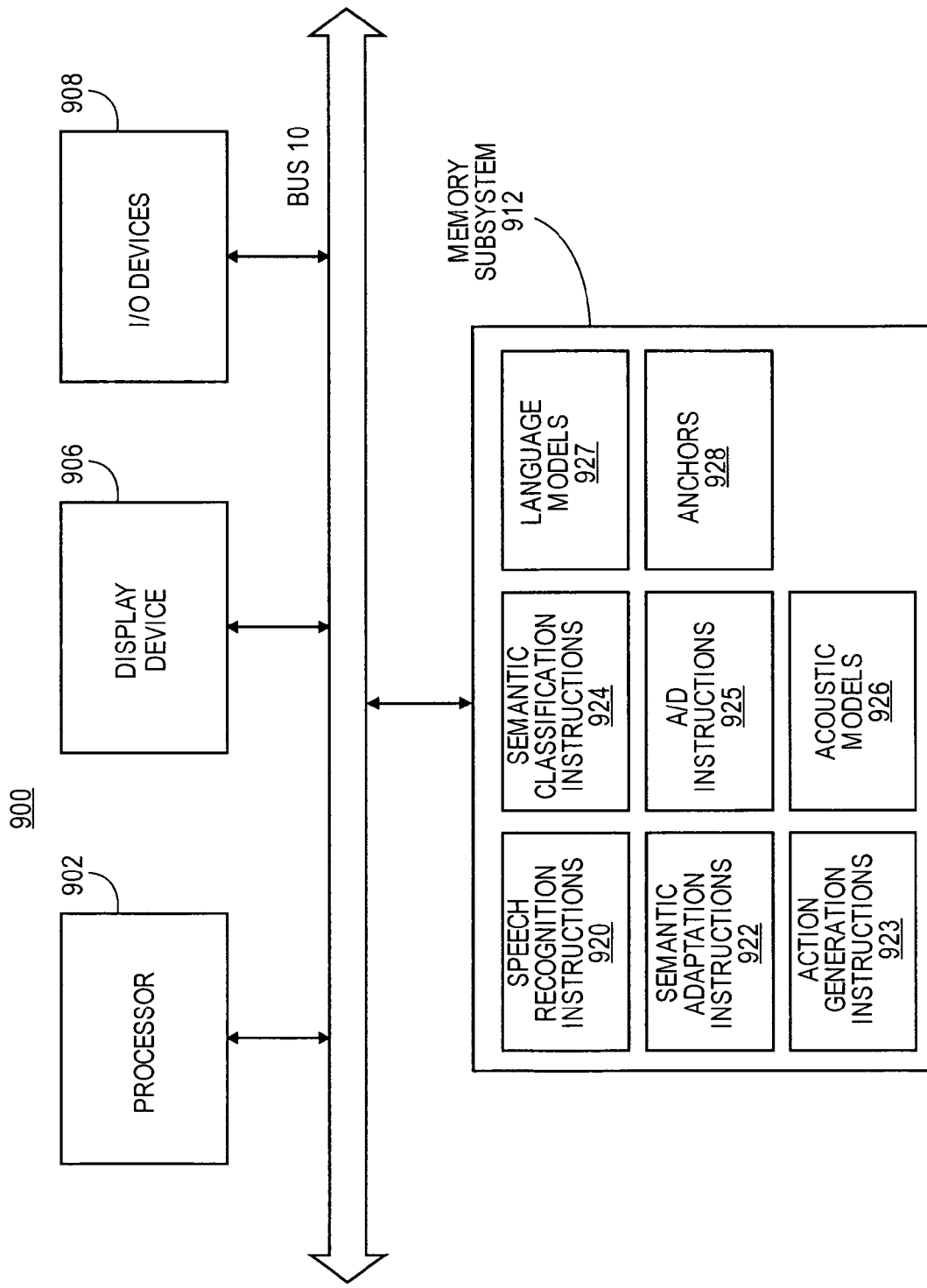
FIG. 9 illustrates one embodiment of a computing device suitable for use with one embodiment the present invention.

FIG. 9 illustrates one embodiment of a computing device suitable for use with one embodiment the present invention. As illustrated, the speech recognition system 100 of FIG. 1 may be implemented on a computer system 900. Computer system 900 includes processor 902, display device 906, and input/output (I/O) devices 908, coupled to each other via a bus 910. Additionally, a memory subsystem 912, which can include one or more of cache memories, system memory (RAM), and nonvolatile storage devices (e.g., magnetic or optical disks) is also coupled to bus 910 for storage of instructions and data for use by processor 902. I/O devices 908 represent a broad range of input and output devices, including keyboards, cursor control devices (e.g., a trackpad or mouse), microphones to capture the voice data, speakers, network or telephone communication interfaces, printers, etc. Computer system 900 also includes well-known audio processing hardware and/or software to transform analog voice data to a digital form which can be processed by the speech recognition system 100 implemented in computer system 900. In addition to personal computers, laptop computers, and workstations, in some embodiments, computer system 900 may be incorporated in a mobile computing device such as a personal digital assistant (PDA) or mobile telephone without departing from the scope of the invention.

Components 902–912 of computer system 900 perform their conventional functions known in the art. Collectively, these components are intended to represent a broad category of hardware systems, including but not limited to general purpose computer systems based on the PowerPC® processor family of processors available from Motorola, Inc. of Schaumburg, Ill., or the Pentium® processor family of processors available from Intel Corporation of Santa Clara, Calif.

It is to be appreciated that various components of computer system 900 may be re-arranged, and that certain implementations of the present invention may not require nor include all of the above components. For example, a display device may not be included in system 900. Additionally, multiple buses (e.g., a standard I/O bus and a high performance I/O bus) may be included in system 900. Furthermore, additional components may be included in system 900, such as additional processors (e.g., a digital signal processor), storage devices, memories, network/communication interfaces, etc.

In the illustrated embodiment of FIG. 9, the method and apparatus for speech recognition using latent semantic adaptation with word and document updates according to the present invention as discussed above is implemented as a series of software routines run by computer system 900 of FIG. 9. These software routines comprise a plurality or series of instructions to be executed by a processing system in a hardware system, such as processor 902 of FIG. 9. Initially, the series of instructions are stored on a storage device of memory subsystem 912. It is to be appreciated that the series of instructions can be stored using any conventional computer-readable or machine-accessible storage medium, such as a diskette, CD-ROM, magnetic tape, DVD, ROM, Flash memory, etc. It is also to be appreciated that the series of instructions need not be stored locally, and could be stored on a propagated data signal received from a remote storage device, such as a server on a network, via a network/communication interface. The instructions are copied from the storage device, such as mass storage, or from the propagated data signal into a memory subsystem 912 and then accessed and executed by processor 902. In one implementation, these software routines are written in the C++ programming language. It is to be appreciated, however, that these routines may be implemented in any of a wide variety of programming languages.

These software routines are illustrated in memory subsystem 912 as speech recognition instructions 920, latent semantic adaptation instructions 922, latent semantic classification instructions 924, and action generation instructions 923. Also illustrated are analog to digital (A/D) transformation instructions 925, acoustic model(s) 926, and language model(s) 927 that support the speech recognition system 100.

In the illustrated embodiment, the memory subsystem 912 of FIG. 9 also includes the semantic anchors 928 that comprise the word and document vectors of the LSA spaces 312 and 412. In one embodiment, the semantic anchors 928 are implemented in a speech recognition database using any of a wide variety of database formats known in the art. As with the software instructions, the semantic anchors 928 may be copied from a storage device, such as mass storage, or from a propagated data signal into the memory subsystem 912 and then accessed and executed by processor 902.

In alternate embodiments, the present invention is implemented in discrete hardware or firmware. For example, one or more application specific integrated circuits (ASICs) could be programmed with the above described functions of the present invention. By way of another example, speech recognition unit 104, adapted LSA space derivation unit 111, semantic classification unit 112, and application unit 118 of FIG. 1 could be implemented in one or more ASICs of an additional circuit board for insertion into hardware system 900 of FIG. 9.

In the discussions above, the present invention is described with reference to speech recognition systems. It is to be appreciated, however, that alternate embodiments of the present invention can be used with other types of pattern recognition systems, such as visual rather than audio pattern recognition, handwriting recognition systems (e.g., optical character recognition (OCR)), etc.

It is to be appreciated that the method and apparatus for speech recognition using latent semantic adaptation with word and document update of the present invention can be employed in any of a wide variety of manners. By way of example, a speech recognition system employing latent semantic adaptation with word and document update could be used in conventional personal computers, security systems, home entertainment or automation systems, etc.

Figure 10:
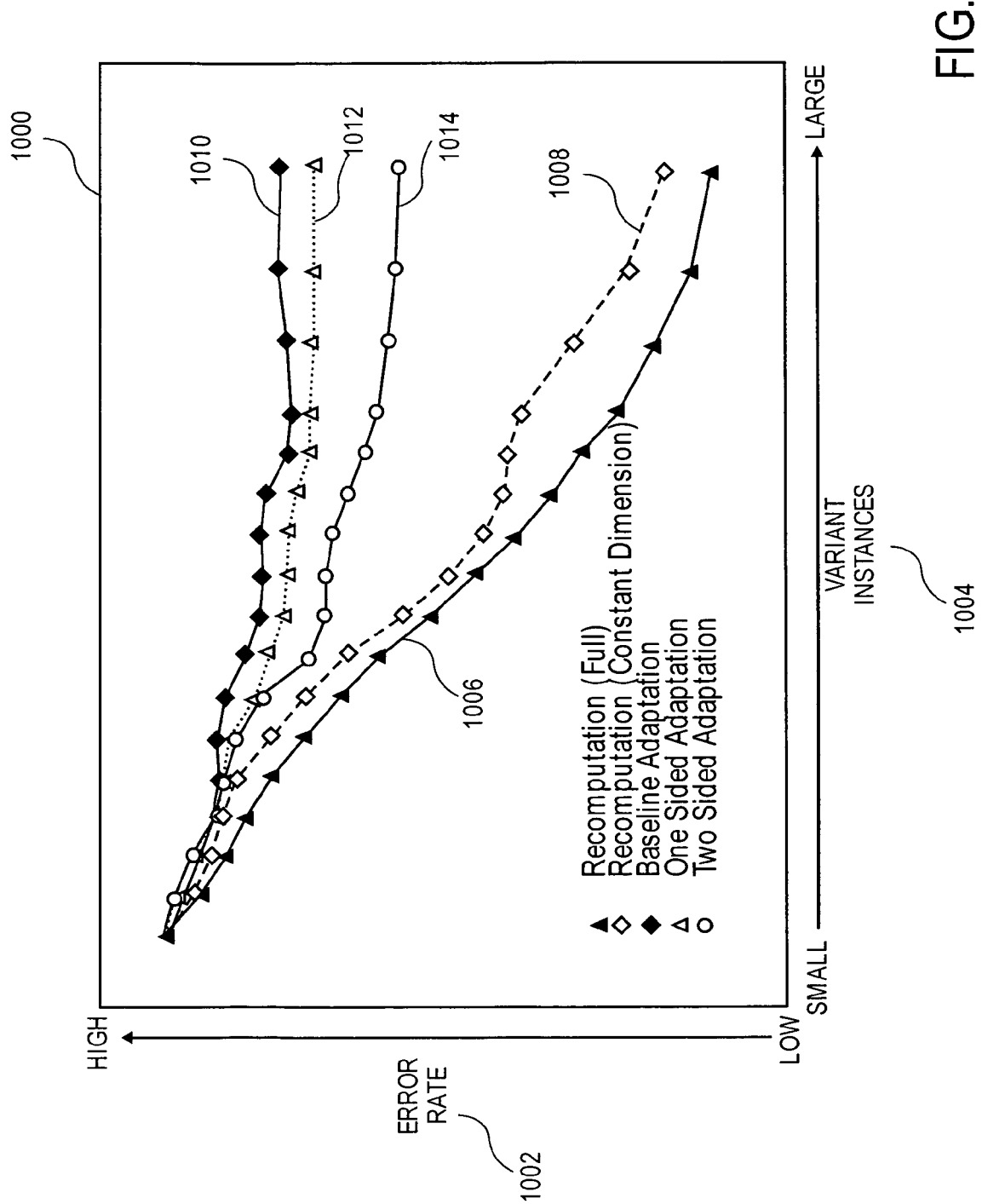
FIG. 10 illustrates a graph comparing the misclassification error rates of an embodiment of the present invention as compared to other methods of re-computation and adaptation of the LSA space.

The performance of the above system was tested in the context of the "Speakable Items" desktop command and control task defined on the MacOS operating system. FIG. 10 illustrates a graph 1000 showing the misclassification error rates 1002 of five different approaches to command classification versus the number of variants 1004 of a collection of canonical commands from a number of different speakers. During performance testing, the five different approaches that were considered were: (i) full re-computation of the LSA space from scratch 1006, which served as a benchmark against which to measure the other setups; (ii) constant dimension re-computation of the LSA space 1008, where the LSA space is re-computed from scratch, but the LSA dimension remains constant at R=100; (iii) baseline adaptation of the LSA space 1010 using traditional "folding-in" of the new words and documents in the existing LSA space; (iv) one-sided adaptation of the LSA space 1012, where only the new documents are used to adapt the LSA space using one embodiment of latent semantic adaptation in accordance with the present invention; and (v) two-sided adaptation of the LSA space 1014, where both the new documents as well as the new words contained in the new documents are used to adapt the LSA space using one embodiment of latent semantic adaptation in accordance with the present invention.

As shown in FIG. 10, the two-sided adaptation approach 1014 remains competitive with constant dimension re-computation 1008 when the new words and documents vary from the original training corpus. In other words, the two-sided adaptation approach 1014 achieves a lower misclassification error rate 1002 than the baseline adaptation approach 1010 as the number of variant instances 1004 increases. Although less optimal than the two-sided approach, the same holds true for the one-sided adaptation approach 1012. Moreover, the competitive performance of the one-sided and two-sided latent semantic adaptation approaches 1012 and 1014 is achieved at a computation cost only slightly greater than the traditional "folding-in" of the baseline adaptation approach 1010, which has a much lower level of performance.

Therefore, a method and apparatus for speech recognition using latent semantic adaptation has been described. An audio input is provided to a speech recognizer that identifies the words in the input. The sequence of words comprising the audio input are then provided to an adapted LSA space generation unit that first trains the speech recognition system by generating an LSA space that reflects the semantic knowledge represented by a training corpus of words and documents, and then continually adapts the LSA space to reflect the semantic knowledge represented by the new words and documents as they become available. The resulting adapted LSA space can then provided to an application such as a semantic classifier that classifies the audio input as corresponding to a particular command, word, or sequence of words, depending on the application. This classification process is advantageously based on an adapted semantic representation of all of the words and documents that comprise the audio input rather than on a semantic representation of just the words and documents in the original training corpus. Thus, any application that needs to quickly and accurately recognize a particular speech utterance associated with a semantic representation may employ the adapted semantic representation provided by the method and apparatus of the present invention. The adapted semantic representation of all of the words and documents comprising the audio input advantageously allows the present invention to accurately recognize speech in real-time, even when the speech includes words and documents not in the original training corpus. Finally, whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method for generating a speech recognition database comprising:
    generating a latent semantic analysis (LSA) space from a training corpus of documents representative of a language, wherein the LSA space includes one or more document vectors;
    receiving a new document that represents a change in the language; and
    adapting the LSA space to reflect the change in the language, wherein the adapting includes changing a position of the one or more document vectors in the LSA space by the change in the language.

2. The method of claim 1, wherein adapting the LSA space to reflect the change in the language comprises transforming the LSA space to take into account the new document's influence on the LSA space without re-computing the LSA space.

3. The method of claim 2, wherein transforming the LSA space comprises:
    obtaining a training document vector that characterizes a semantic position of the training document within the LSA space;
    computing a new document vector that characterizes a semantic position of the new document within the LSA space;
    deriving a document vector transformation matrix; and
    applying the document vector transformation matrix to the training document vector and the new document vector to shift a position of each document vector in the LSA space,
    where the shift in the position reflects the change in the language.

4. A method for generating a speech recognition database comprising:
    generating a latent semantic analysis (LSA) space from a training corpus of documents representative of a language, wherein the LSA space includes one or more document vectors;
    receiving a new document that represents a change in the language; and
    adapting the LSA space to reflect the change in the language, wherein the change in the language includes changing a position of the one or more document vectors, wherein adapting the LSA space to reflect the change in the language comprises transforming the LSA space to take into account the new document's influence on the LSA space without re-computing the LSA space, wherein the transforming the LSA space comprises
    obtaining a training document vector that characterizes a semantic position of the training document within the LSA space;
    computing a new document vector that characterizes a semantic position of the new document within the LSA space;
    deriving a document vector transformation matrix; and
    applying the document vector transformation matrix to the training document vector and the new document vector to shift a position of each document vector in the LSA space, where the shift in the position reflects the change in the language;
    obtaining a training word vector that characterizes a semantic position of the training word within the LSA space;
    computing a new word vector that characterizes a semantic position of the new word within the LSA space;
    deriving a word vector transformation matrix; and
    applying the word vector transformation matrix to the training word vector and the new word vector to shift a position of each word vector in the LSA space, where the shift in the position reflects the change in the language.

5. The method of claim 4, wherein:
    the training document vector is VS, where VS is computed from a right singular matrix V and a diagonal matrix S, each of which was obtained from a previous singular value decomposition (SVD) of a training word-document matrix constructed during the generation of the LSA space, the training word-document matrix representing the extent to which each of the words appears in each of the documents of the training corpus;
    the new document vector ZS, where ZS is computed from the diagonal matrix S and an extension matrix Z, wherein Z is an extension of the right singular matrix V obtained by folding in a new word-document matrix, the new word-document matrix representing the extent to which a new word appears in the new document; and
    the document vector transformation matrix is J, wherein J is obtained from a Choleski decomposition of a matrix derived from an extension matrix Y, wherein Y is an extension of a left singular matrix U obtained by folding in the new word-document matrix and wherein U was obtained from the previous SVD of the training word-document matrix constructed during the generation of the LSA space.

6. The method of claim 5, wherein:
    the training word vector is US, wherein US is computed from the left singular matrix U and the diagonal matrix S;
    the new word vector is YS, wherein YS is computed from the diagonal matrix S and the extension matrix Y; and
    the word vector transformation matrix is K, wherein K is obtained from a Choleski decomposition of a matrix derived from the extension matrix Z.

7. The method of claim 6, wherein transforming the LSA space comprises applying the document vector transformation matrix and the word vector transformation matrix simultaneously.

8. The method of claim 6, wherein when the new document matrix contains more new documents than new words, then transforming the LSA space comprises:
  applying the word vector transformation matrix K, first; and
  applying the document vector transformation matrix J second, wherein the extension matrix Y is not obtained by folding in the new word-document matrix, but is rather derived from the extension matrix Z.

9. The method of claim 6, wherein when the new document matrix contains more new words than new documents, then transforming the LSA space comprises:
  applying the document vector transformation matrix J first; and
  applying the word vector transformation matrix K second, wherein the extension matrix Z is not obtained by folding in the new word-document matrix, but is rather derived from the extension matrix Y.

10. The method of claim 1, wherein the change in the language is a change in the language's domain.

11. The method of claim 1, wherein the change in the language is a change in the language's style.

12. A computer-readable medium having executable instructions to cause a computer to perform a method for generating a speech recognition database comprising:
  generating a latent semantic analysis (LSA) space from a training corpus of documents representative of a language, wherein the LSA space includes one or more document vectors;
  receiving a new document that represents a change in the language; and
  adapting the LSA space to reflect the change in the language, wherein the adapting includes changing a position of the one or more document vectors in the LSA space by the change in the language.

13. The computer-readable medium of claim 12, wherein adapting the LSA space to reflect the change in the language further comprises transforming the LSA space to take into account the new document's influence on the LSA space without re-computing the LSA space.

14. The computer-readable medium of claim 13, wherein transforming the LSA space further comprises:
  obtaining a training document vector that characterizes a semantic position of the training document within the LSA space;
  computing a new document vector that characterizes a semantic position of the new document within the LSA space;
  deriving a document vector transformation matrix; and
  applying the document vector transformation matrix to the training document vector and the new document vector to shift a position of each document vector in the LSA space, where the shift in the position reflects the change in the language.

15. A computer-readable medium having executable instructions to cause a computer to perform a method for generating a speech recognition database comprising:
  generating a latent semantic analysis (LSA) space from a training corpus of documents representative of a language, wherein the LSA space includes one or more document vectors;
  receiving a new document that represents a change in the language; and
  adapting the LSA space to reflect the change in the language, wherein the change in the language includes changing a position of the one or more document vectors, wherein adapting the LSA space to reflect the change in the language further comprises transforming the LSA space to take into account the new document's influence on the LSA space without re-computing the LSA space, wherein the transforming the LSA space comprises
  obtaining a training document vector that characterizes a semantic position of the training document within the LSA space;
  computing a new document vector that characterizes a semantic position of the new document within the LSA space;
  deriving a document vector transformation matrix; and
  applying the document vector transformation matrix to the training document vector and the new document vector to shift a position of each document vector in the LSA space, where the shift in the position reflects the change in the language;
  obtaining a training word vector that characterizes a semantic position of the training word within the LSA space;
  computing a new word vector that characterizes a semantic position of the new word within the LSA space;
  deriving a word vector transformation matrix; and
  applying the word vector transformation matrix to the training word vector and the new word vector to shift a position of each word vector in the LSA space, where the shift in the position reflects the change in the language.

16. A computer-readable medium having executable instructions to cause a computer to perform a method for generating a speech recognition database comprising:
  generating a latent semantic analysis (LSA) space from a training corpus of documents representative of a language, wherein the LSA space includes one or more document vectors;
  receiving a new document that represents a change in the language; and
  adapting the LSA space to reflect the change in the language, wherein the change in the language includes changing a position of the one or more document vectors, wherein adapting the LSA space to reflect the change in the language further comprises transforming the LSA space to take into account the new document's influence on the LSA space without re-computing the LSA space, wherein transforming the LSA space comprises
  obtaining a training document vector that characterizes a semantic position of the training document within the LSA space;
  computing a new document vector that characterizes a semantic position of the new document within the LSA space;
  deriving a document vector transformation matrix; and
  applying the document vector transformation matrix to the training document vector and the new document vector to shift a position of each document vector in the LSA space, where the shift in the position reflects the change in the language, wherein the training document vector is VS where VS is computed from a right singular matrix V and a diagonal matrix S, each of which was obtained from a previous singular value decomposition (SVD) of a training word-document matrix constructed during the generation of the LSA space, the training word-document matrix representing the extent to which each of the words appears in each of the documents of the training corpus;

the new document vector is ZS where ZS is computed from the diagonal matrix S and an extension matrix Z, wherein Z is an extension of the right singular matrix V obtained by folding in a new word-document matrix, the new word-document matrix representing the extent to which a new word appears in the new document; and the document vector transformation matrix is J, wherein J is obtained from a Choleski decomposition of a matrix derived from an extension matrix Y, wherein Y is an extension of a left singular matrix U obtained by folding in the new word-document matrix, and wherein U was obtained from the previous SVD of the training word-document matrix constructed during the generation of the LSA space.

17. The computer-readable medium of claim 16, wherein:

the training word vector is US, wherein US is computed from the left singular matrix U and the diagonal matrix S;

the new word vector is YS, wherein YS is computed from the diagonal matrix S and the extension matrix Y; and the word vector transformation matrix is K, wherein K is obtained from a Choleski decomposition of a matrix derived from the extension matrix Z.

18. The computer-readable medium of claim 17, wherein transforming the LSA space further comprises applying the document vector transformation matrix and the word vector transformation matrix simultaneously.

19. The computer-readable medium of claim 17, wherein, when the new document matrix contains more new documents than new words, transforming the LSA space further comprises:

applying the word vector transformation matrix K, first; and applying the document vector transformation matrix is J second, wherein the extension matrix Y is not obtained by folding in the new word-document matrix, but is rather derived from the extension matrix Z.

20. The computer-readable medium of claim 17, wherein, when the new document matrix contains more new words than new documents, transforming the LSA space comprises:

applying the document vector transformation matrix J first; and applying the word vector transformation matrix K second, wherein the extension matrix Z is not obtained by folding in the new word-document matrix, but is rather derived from the extension matrix Y.

21. The computer-readable medium of claim 12, wherein the change in the language is a change in the language's domain.

22. The computer-readable medium of claim 12, wherein the change in the language is a change in the language's style.

23. An apparatus for generating a speech recognition database, the apparatus comprising:

a latent semantic analysis (LSA) space generator to generate an LSA space from a training corpus of documents representative of a language, wherein the LSA space includes one or more document vectors;

a document receiver to receive a new document that represents a change in the language; and an LSA space adapter to adapt the LSA space to reflect the change in the language, wherein adapting includes changing a position of the one or more document vectors in the LSA space by the change in the language.

24. The apparatus of claim 23, wherein LSA space adapter transforms the LSA space to take into account the new documents influence on the LSA space without re-computing the LSA space.

25. The apparatus of claim 24, wherein the LSA space adapter transforms the LSA space by:

obtaining a training document vector that characterizes a semantic position of the training document within the LSA space;

computing a new document vector that characterizes a semantic position of the new document within the LSA space;

deriving a document vector transformation matrix; and applying the document vector transformation matrix to the training document vector and the new document vector to shift a position of each document vector in the LSA space, where the shift in the position reflects the change in the language.

26. An apparatus for generating a speech recognition database, the apparatus comprising:

a latent semantic analysis (LSA) space generator to generate an LSA space from a training corpus of documents representative of a language, wherein the LSA space includes one or more document vectors;

a document receiver to receive a new document that represents a change in the language; and an LSA space adapter to adapt the LSA space to reflect the change in the language, wherein the change in the language includes changing a position of the one or more document vectors, wherein LSA space adapter transforms the LSA space to take into account the new document's influence on the LSA space without recomputing the LSA space, wherein the LSA space adapter transforms the LSA space by obtaining a training document vector that characterizes a semantic position of the training document within the LSA space;

computing a new document vector that characterizes a semantic position of the new document within the LSA space;

deriving a document vector transformation matrix; and applying the document vector transformation matrix to the training document vector and the new document vector to shift a position of each document vector in the LSA space, where the shift in the position reflects the change in the language;

obtaining a training word vector that characterizes a semantic position of the training word within the LSA space;

computing a new word vector that characterizes a semantic position of the new word within the LSA space;

deriving a word vector transformation matrix; and applying the word vector transformation matrix to the training word vector and the new word vector to shift a position of each word vector in the LSA space, where the shift in the position reflects the change in the language.

27. The apparatus of claim 26, wherein:

the training document vector is VS, where VS is computed from a right singular matrix V and a diagonal matrix S, each of which was obtained from a previous singular value decomposition (SVD) of a training word-document matrix constructed during the generation of the LSA space, the training word-document matrix representing the extent to which each of the words appears in each of the documents of the training corpus;

the new document vector ZS, where ZS is computed from the diagonal matrix S and an extension matrix Z, wherein Z is an extension of the right singular matrix V obtained by folding in a new word-document matrix, the new word-document matrix representing the extent to which a new word appears in the new document; and the document vector transformation matrix is J, wherein J is obtained from a Choleski decomposition of a matrix derived from an extension matrix Y, wherein Y is an extension of a left singular matrix U obtained by folding in the new word-document matrix, and wherein U was obtained from the previous SVD of the training word-document matrix constructed during the generation of the LSA space.

28. The apparatus of claim 26, wherein:

the training word vector is US, where US is computed from a left singular matrix U and the diagonal matrix S;

the new word vector is YS, where YS is computed from the diagonal matrix S and the extension matrix Y; and the word vector transformation matrix is K, wherein K is obtained from a Choleski decomposition of a matrix derived from the extension matrix Z.

29. The apparatus of claim 26, wherein the LSA space adapter transforms the LSA space by applying the document vector transformation matrix and the word vector transformation matrix simultaneously.

30. The apparatus of claim 26, wherein when the new document matrix contains more new documents than new words, then the LSA space adapter transforms space by:

applying the word vector transformation matrix K, first; and applying the document vector transformation matrix is J second, wherein the extension matrix Y is not obtained by folding in the new word-document matrix, but is rather derived from the extension matrix Z.

31. The apparatus of claim 26, wherein when the new document matrix contains more new words than new documents, then the LSA space adapter transforms the LSA space by:

applying the document vector transformation matrix J first; and applying the word vector transformation matrix K second, wherein the extension matrix Z is not obtained by folding in the new word-document matrix, but is rather derived from the extension matrix Y.

32. The apparatus of claim 23, wherein the change in the language is a change in the language's domain.

33. The apparatus of claim 23, wherein the change in the language is a change in the language's style.

34. An apparatus for recognizing speech, the apparatus comprising:

means for recognizing an audio input as a new document; and means for processing the new document using latent semantic adaptation, wherein the means for processing include means for generating a latent semantic analysis (LSA) space from a training corpus of documents representative of a language, wherein the LSA space includes one or more document vectors;

means for receiving the new document that represents a change in the language; and means for adapting the LSA space to reflect the change in the language, wherein the means for adapting includes means for changing a position of the one or more document vectors in the LSA space by the change in the language; and means, coupled to the means for processing, for semantically inferring from a vector representation of the new document which of a plurality of known words and known documents correlate to the new document.

35. The apparatus of claim 34, wherein the means for adapting the LSA space to reflect the change in the language comprises a means for transforming the LSA space to take into account the new document's influence on the LSA space without re-computing the LSA space.

36. The apparatus of claim 35, wherein the means for transforming the LSA space comprises:

means for obtaining a training document vector that characterizes a semantic position of the training document within the LSA space;

means for computing a new document vector that characterizes a semantic position of the new document within the LSA space;

means for deriving a document vector transformation matrix; and means for applying the document vector transformation matrix to the training document vector and the new document vector to shift a position of each document vector in the LSA space, where the shift in the position reflects the change in the language.

37. An apparatus for recognizing speech, the apparatus comprising:

means for recognizing an audio input as a new document; and means for processing the new document using latent semantic adaptation, wherein the means for processing include means for generating a latent semantic analysis (LSA) space from a training corpus of documents representative of a language, wherein the LSA space includes one or more document vectors;

means for receiving the new document that represents a change in the language; and means for adapting the LSA space to reflect the change in the language, wherein the change in the language includes changing a position of the one or more document vectors, wherein the means for adapting the LSA space to reflect the change in the language comprises a means for transforming the LSA space to take into account the new document's influence on the LSA space without re-computing the LSA space, wherein the means for transforming the LSA space comprises means for obtaining a training document vector that characterizes a semantic position of the training document within the LSA space;

means for computing a new document vector that characterizes a semantic position of the new document within the LSA space;

means for deriving a document vector transformation matrix; and means for applying the document vector transformation matrix to the training document vector and the new document vector to shift a position of each document vector in the LSA space, where the shift in the position reflects the change in the language;

means, coupled to the means for processing, for semantically inferring from a vector representation of the new document which of a plurality of known words and known documents correlate to the new document, means for obtaining a training word vector that characterizes a semantic position of the training word within the LSA space;

means for computing a new word vector that characterizes a semantic position of the new word within the LSA space;

means for deriving a word vector transformation matrix; and means for applying the word vector transformation matrix to the training word vector and the new word vector to shift a position of each word vector in the LSA space, where the shift in the position reflects the change in the language.

38. The apparatus of claim 37, wherein:

the training document vector is VS, where VS is computed from a right singular matrix V and a diagonal matrix S, each of which was obtained from a previous singular value decomposition (SVD) of a training word-document matrix constructed during the generation of the LSA space, the training word-document matrix representing the extent to which each of the words appears in each of the documents of the training corpus;

the new document vector ZS, where ZS is computed from the diagonal matrix S and an extension matrix Z, wherein Z is an extension of the right singular matrix V obtained by folding in a new word-document matrix, the new word-document matrix representing the extent to which a new word appears in the new document; and the document vector transformation matrix is J, wherein J is obtained from a Choleski decomposition of a matrix derived from an extension matrix Y, wherein Y is an extension of a left singular matrix U obtained by folding in the new word-document matrix, and wherein U was obtained from the previous SVD of the training word-document matrix constructed during the generation of the LSA space.

39. The apparatus of claim 38, wherein:

the training word vector is US, wherein US is computed from the left singular matrix U and the diagonal matrix S;

the new word vector is YS, where YS is computed from the the diagonal matrix S and the extension matrix Y; and the word vector transformation matrix is K, wherein K is obtained from a Choleski decomposition of a matrix derived from the extension matrix Z.

40. An apparatus for recognizing speech, the apparatus comprising:

means for recognizing an audio input as a new document; and means for processing the new document using latent semantic adaptation, wherein the means for processing include means for generating a latent semantic analysis (LSA) space from a training corpus of documents representative of a language, wherein the LSA space includes one or more document vectors;

means for receiving the new document that represents a change in the language; and means for adapting the LSA space to reflect the change in the language, wherein the change in the language includes changing a position of the one or more document vectors, wherein the means for adapting the LSA space to reflect the change in the language comprises a means for transforming the LSA space to take into account the new document's influence on the LSA space without re-computing the LSA space, wherein the means for transforming the LSA space comprises means for obtaining a training document vector that characterizes a semantic position of the training document within the LSA space;

means for computing a new document vector that characterizes a semantic position of the new document within the LSA space;

means for deriving a document vector transformation matrix; and means for applying the document vector transformation matrix to the training document vector and the new document vector to shift a position of each document vector in the LSA space, where the shift in the position reflects the change in the language; and means, coupled to the means for processing, for semantically inferring from a vector representation of the new document which of a plurality of known words and known documents correlate to the new document, wherein the means for transforming the LSA space further comprises means for applying the document vector transformation matrix and the word vector transformation matrix simultaneously.

41. An apparatus for recognizing speech, the apparatus comprising:

means for recognizing an audio input as a new document; and means for processing the new document using latent semantic adaptation, wherein the means for processing include means for generating a latent semantic analysis (LSA) space from a training corpus of documents representative of a language, wherein the LSA space includes one or more document vectors;

means for receiving the new document that represents a change in the language; and means for adapting the LSA space to reflect the change in the language, wherein the change in the language includes changing a position of the one or more document vectors, wherein the means for adapting the LSA space to reflect the change in the language comprises a means for transforming the LSA space to take into account the new document's influence on the LSA space without re-computing the LSA space, wherein the means for transforming the LSA space comprises:

means for obtaining a training document vector that characterizes a semantic position of the training document within the LSA space;

means for computing a new document vector that characterizes a semantic position of the new document within the LSA space;

means for deriving a document vector transformation matrix; and means for applying the document vector transformation matrix to the training document vector and the new document vector to shift a position of each document vector in the LSA space, where the shift in the position reflects the change in the language; and means, coupled to the means for processing, for semantically inferring from a vector representation of the new document which of a plurality of known words and known documents correlate to the new document, wherein when the new document matrix contains more new documents than new words, then the means for transforming the LSA space further comprises means for applying the word vector transformation matrix K, first; and means for applying the document vector transformation matrix J second, wherein the means for obtaining the extension matrix Y is not by folding in the new word-document matrix, but is rather by deriving extension matrix Y from the extension matrix Z.

42. An apparatus for recognizing speech, the apparatus comprising:
   means for recognizing an audio input as a new document; and
   means for processing the new document using latent semantic adaptation, wherein the means for processing include
   means for generating a latent semantic analysis (LSA) space from a training corpus of documents representative of a language wherein the LSA space includes one or more document vectors;
   means for receiving the new document that represents a change in the language; and
means for adapting the LSA space to reflect the change in the language, wherein the change in the language includes changing a position of the one or more document vectors, wherein the means for adapting the LSA space to reflect the change in the language comprises a means for transforming the LSA space to take into account the new document's influence on the LSA space without re-computing the LSA space, wherein the means for transforming the LSA space comprises:
   means for obtaining a training document vector that characterizes a semantic position of the training document within the LSA space;
   means for computing a new document vector that characterizes a semantic position of the new document within the LSA space;
   means for deriving a document vector transformation matrix; and
   means for applying the document vector transformation matrix to the training document vector and the new document vector to shift a position of each document vector in the LSA space, where the shift in the position reflects the change in the language; and
   means, coupled to the means for processing, for semantically inferring from a vector representation of the new document which of a plurality of known words and known documents correlate to the new document, wherein when the new document matrix contains more new words than new documents, then the means for transforming the LSA space further comprises
   means for applying the document vector transformation matrix J first; and
   means for applying the word vector transformation matrix K second, wherein the means for obtaining the extension matrix Z is not by folding in the new word-document matrix, but is rather by deriving the extension matrix Z from the extension matrix Y.

43. The apparatus of claim 34, wherein the change in the language is a change in the language's domain.

44. The apparatus of claim 34 wherein the change in the language is a change in the language's style.

45. A system for processing speech, the system comprising:
   a speech recognition database comprising a latent semantic analysis (LSA) space generated from a training corpus of documents representative of a language, wherein the LSA space includes one or more document vectors;
   an input receiver to receive a new document that represents a change in the language; and
   a processing system to adapt the LSA space to reflect the change in the language, wherein the adapting includes changing a position of the one or more document vectors in the LSA space by the change in the language.

46. The system of claim 45, wherein the processing system adapts the LSA space by transforming the LSA space to take into account the new document's influence on the LSA space without re-computing the LSA space.

47. The system of claim 46, wherein the processing system transforms the LSA space by:
   obtaining a training document vector that characterizes a semantic position of the training document within the LSA space;
   computing a new document vector that characterizes a semantic position of the new document within the LSA space;
   deriving a document vector transformation matrix; and
   applying the document vector transformation matrix to the training document vector and the new document vector to shift a position of each document vector in the LSA space, where the shift in the position reflects the change in the language.

48. A system for processing speech, the system comprising:
   a speech recognition database comprising a latent semantic analysis (LSA) space generated from a training corpus of documents representative of a language, wherein the LSA space includes one or more document vectors;
   an input receiver to receive a new document that represents a change in the language; and
   a processing system to adapt the LSA space to reflect the change in the language, wherein the change in the language includes changing a position of the one or more document vectors, wherein the processing system adapts the LSA space by transforming the LSA space to take into account the new document's influence on the LSA space without re-computing the LSA space, wherein the processing system transforms the LSA space by
   obtaining a training document vector that characterizes a semantic position of the training document within the LSA space;
   computing a new document vector that characterizes a semantic position of the new document within the LSA space;
   deriving a document vector transformation matrix; and
   applying the document vector transformation matrix to the training document vector and the new document vector to shift a position of each document vector in the LSA space, where the shift in the position reflects the change in the language;
   obtaining a training word vector that characterizes a semantic position of the training word within the LSA space;
   computing a new word vector that characterizes a semantic position of the new word within the LSA space;
   deriving a word vector transformation matrix; and
   applying the word vector transformation matrix to the training word vector and the new word vector to shift a position of each word vector in the LSA space, where the shift in the position reflects the change in the language.

49. The system of claim 48, wherein:
   the training document vector is VS, where VS is computed from a right singular matrix V and a diagonal matrix S, each of which was obtained from a previous singular value decomposition (SVD) of a training word-document matrix constructed during the generation of the LSA space, the training word-document matrix representing the extent to which each of the words appears in each of the documents of the training corpus;

the new document vector ZS, where ZS is computed from the diagonal matrix S and an extension matrix Z, wherein Z is an extension of the right singular matrix V obtained by folding in a new word-document matrix, the new word-document matrix representing the extent to which a new word appears in the new document; and the document vector transformation matrix is J, wherein J is obtained from a Choleski decomposition of a matrix derived from an extension matrix Y, wherein Y is an extension of a left singular matrix U obtained by folding in the new word-document matrix, and wherein U was obtained from the previous SVD of the training word-document matrix constructed during the generation of the LSA space.

50. The system of claim 49, wherein:

the training word vector is US, where US is computed from a left singular matrix U and the diagonal matrix S;

the new word vector is YS, wherein YS is computed from the diagonal matrix S and the extension matrix Y; and the word vector transformation matrix is K, wherein K is obtained from a Choleski decomposition of a matrix derived from the extension matrix Z.

51. The system of claim 49, wherein the processing system transforms the LSA space by applying the document vector transformation matrix and the word vector transformation matrix simultaneously.

52. The system of claim 49, wherein when the new document matrix contains more new documents than new words, then the processing system transforms space by:

applying the word vector transformation matrix K, first; and applying the document vector transformation matrix is J second, wherein the extension matrix Y is not obtained by folding in the new word-document matrix, but is rather derived from the extension matrix Z.

53. The system of claim 49, wherein when the new document matrix contains more new words than new documents, then the processing system transforms the LSA space by:

applying the document vector transformation matrix J first; and applying the word vector transformation matrix K second, wherein the extension matrix Z is not obtained by folding in the new word-document matrix, but is rather derived from the extension matrix Y.

54. The system of claim 45, wherein the change in the language is a change in the language's domain.

55. The system of claim 45, wherein the change in the language is a change in the language's style.

* * * * *